U S009460477B2

(12) United States Patent
Ito et al.

(10) Patent No.: US 9,460,477 B2
(45) Date of Patent: Oct. 4, 2016

(54) INFORMATION PROCESSING APPARATUS AND METHOD AND NON-TRANSITORY COMPUTER READABLE MEDIUM

(71) Applicant: FUJI XEROX CO., LTD., Tokyo (JP)

(72) Inventors: Tomoyuki Ito, Kanagawa (JP); Michiaki Yasuno, Ebina (JP); Hiroshi Umemoto, Yokohama (JP); Satoru Inakage, Ebina (JP)

(73) Assignee: FUJI XEROX CO., LTD., Tokyo (JP)

( * ) Notice: Subject to any disclaimer, the term of this patent is extended or adjusted under 35 U.S.C. 154(b) by 621 days.

(21) Appl. No.: 13/888,842

(22) Filed: May 7, 2013

(65) Prior Publication Data
US 2014/0156655 A1 Jun. 5, 2014

(30) Foreign Application Priority Data

Dec. 5, 2012 (JP) .................................. 2012-266806

(51) Int. Cl.
*G06F 7/00* (2006.01)
*G06Q 50/04* (2012.01)
*G06Q 10/10* (2012.01)

(52) U.S. Cl.
CPC .............. *G06Q 50/04* (2013.01); *G06Q 10/10* (2013.01); *Y02P 90/30* (2015.11)

(58) Field of Classification Search
CPC ................................ G06Q 50/04; Y02P 90/30
USPC ................... 707/602; 704/237; 715/700, 968
See application file for complete search history.

(56) References Cited

U.S. PATENT DOCUMENTS

| 5,745,390 | A  * | 4/1998 | Daneshgari | ........ | G05B 23/0251 |
| | | | | | 700/109 |
| 6,535,775 | B1 * | 3/2003 | Bagepalli | ............... | G06Q 10/06 |
| | | | | | 700/109 |
| 6,766,205 | B1 * | 7/2004 | Williams | ............... | G06Q 10/04 |
| | | | | | 700/103 |

(Continued)

FOREIGN PATENT DOCUMENTS

JP    A-2004-362480    12/2004
JP    2007-219947 A    8/2007

(Continued)

OTHER PUBLICATIONS

Chan et al., Quality Function Deployment: A Comprehensive Review of Its Concepts and Methods, Quality Engineering, 15(1), pp. 23-35 (Mar. 2002).*

(Continued)

*Primary Examiner* — Cheyne D Ly
(74) *Attorney, Agent, or Firm* — Oliff PLC

(57) ABSTRACT

An information processing apparatus includes the following elements. A selector selects, as a first item, an item disposed within a QFD chart. A first calculator calculates a correlation score between the first item and an item associated with an adjacent axis. A first extracting unit compares the correlation score with a predetermined value and extracts a second item related to the first item. A second calculator calculates a correlation score between the second item and an item associated with an adjacent axis and determines the calculated correlation score between the item associated with the adjacent axis and the first item. A second extracting unit compares the correlation score with a predetermined value and extracts a third item related to the first item. A display unit displays the first item, the second item, and the third item in a mode different from a mode of the other items.

8 Claims, 22 Drawing Sheets

(56) References Cited

U.S. PATENT DOCUMENTS

| | | | |
|---|---|---|---|
| 2003/0040954 A1* | 2/2003 | Zelek | G06Q 30/0201 |
| | | | 705/7.29 |
| 2003/0187722 A1* | 10/2003 | Kobayashi | G06Q 10/06 |
| | | | 705/7.36 |
| 2004/0107131 A1* | 6/2004 | Wilkerson | G06Q 10/10 |
| | | | 705/7.29 |
| 2006/0059253 A1* | 3/2006 | Goodman | G06Q 10/10 |
| | | | 709/223 |
| 2014/0156338 A1* | 6/2014 | Ito | G06Q 10/0637 |
| | | | 705/7.27 |

FOREIGN PATENT DOCUMENTS

| | | |
|---|---|---|
| JP | 2010-066955 A | 3/2010 |
| JP | A-2010-128708 | 6/2010 |

OTHER PUBLICATIONS

Dean, E., Quality Function Deployment for Large Systems, pp. 317-321, Engineering Management Conference, 1992. Managing in a Global Environment., 1992 IEEE International.*

Mar. 15, 2016 Office Action issued in Japanese Patent Application No. 2012-266806.

Imazato; "New book for deeeeply understanding how to use the seven tools of QC;" 1st Edition; May 1, 2012; pp. 110-113, 116-117.

Yamaguchi; "CrossConcept;" http://www.yamahige.jp/cross-concept/; Sep. 3, 2007; accessed Mar. 3, 2016.

Atsuta et al; "The concatenation of XDDP and test process using 'T-type matrix';" Conference on Rational Derivational Development 2012; http://affordd.jp/conference2012/xddp2012_p2_paper.pdf; Jun. 30, 2012; accessed Mar. 3, 2016.

* cited by examiner

FIG. 15

| AXIS NAME | ITEM NAME | | |
|---|---|---|---|
| | LARGE CLASSIFICATION | MEDIUM CLASSIFICATION | SMALL CLASSIFICATION |
| QUALITY | | | QUALITY A |
| QUALITY | | | QUALITY B |
| QUALITY | | | QUALITY C |
| PERFORMANCE | COOKING CONTAINER | | CAPABILITY X |
| PERFORMANCE | COOKING CONTAINER | | CAPABILITY Y |
| MECHANISM | COOKING CONTAINER | TYPE A | MECHANISM A-1 |
| MECHANISM | COOKING CONTAINER | TYPE A | MECHANISM A-2 |
| MECHANISM | HANDLE | TYPE B | MECHANISM B |
| MECHANISM | HANDLE | TYPE C | MECHANISM C |
| STRUCTURES AND PHYSICAL PROPERTIES | COOKING CONTAINER | STRUCTURES | STRUCTURE 1 |
| STRUCTURES AND PHYSICAL PROPERTIES | COOKING CONTAINER | STRUCTURES | STRUCTURE 2 |
| STRUCTURES AND PHYSICAL PROPERTIES | COOKING CONTAINER | PHYSICAL PROPERTIES | PHYSICAL PROPERTY 1 |
| STRUCTURES AND PHYSICAL PROPERTIES | COOKING CONTAINER | PHYSICAL PROPERTIES | PHYSICAL PROPERTY 2 |
| PHYSICAL CHARACTERISTICS | COOKING CONTAINER | STRUCTURES | STRUCTURE 11 |
| PHYSICAL CHARACTERISTICS | COOKING CONTAINER | PHYSICAL PROPERTIES | PHYSICAL PROPERTY 21 |
| PRODUCTION CONDITIONS | COOKING CONTAINER | | PRODUCTION CONDITION a |
| PRODUCTION CONDITIONS | COOKING CONTAINER | | PRODUCTION CONDITION b |
| PRODUCTION CONDITIONS | COOKING CONTAINER | | PRODUCTION CONDITION c |
| DESIGN PARAMETERS | COOKING CONTAINER | | PARAMETER x |
| DESIGN PARAMETERS | COOKING CONTAINER | | PARAMETER y |
| TECHNIQUES | | | TECHNIQUE α |
| TECHNIQUES | | | TECHNIQUE β |

INFORMATION PROCESSING APPARATUS AND METHOD AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-266806 filed Dec. 5, 2012.

BACKGROUND

Technical Field

The present invention relates to an information processing apparatus and method, and a non-transitory computer readable medium.

SUMMARY

According to an aspect of the invention, there is provided an information processing apparatus including: a selector that selects, as a first item, an item disposed within a QFD chart through a selecting operation performed by an operator, the QFD chart having at least three axes, an item being associated with each of the axes, and a matrix which indicates relationships between items being deployed between two axes of the QFD chart; a first calculator that performs calculating processing for calculating a correlation score between the first item selected by the selector and an item associated with an axis adjacent to the axis of the first item; a first extracting unit that performs extracting processing for comparing the correlation score calculated by the first calculator with a predetermined value and for extracting a second item related to the first item on the basis of comparison results; a second calculator that performs calculating processing for calculating a correlation score between the second item extracted by the first extracting unit and an item associated with an axis adjacent to the axis of the second item so as to determine the calculated correlation score to be a correlation score between the item associated with the adjacent axis and the first item; a second extracting unit that performs extracting processing for comparing the correlation score calculated by the second calculator with a predetermined value and for extracting a third item related to the first item on the basis of comparison results; and a display unit that displays the first item, the second item, and the third item within the QFD chart in a mode different from a mode of the other items.

BRIEF DESCRIPTION OF THE DRAWINGS

Exemplary embodiments of the present invention will be described in detail based on the following figures, wherein:

FIG. 15 illustrates an example of the data structure of an axis item table;

DETAILED DESCRIPTION

Figure 1:
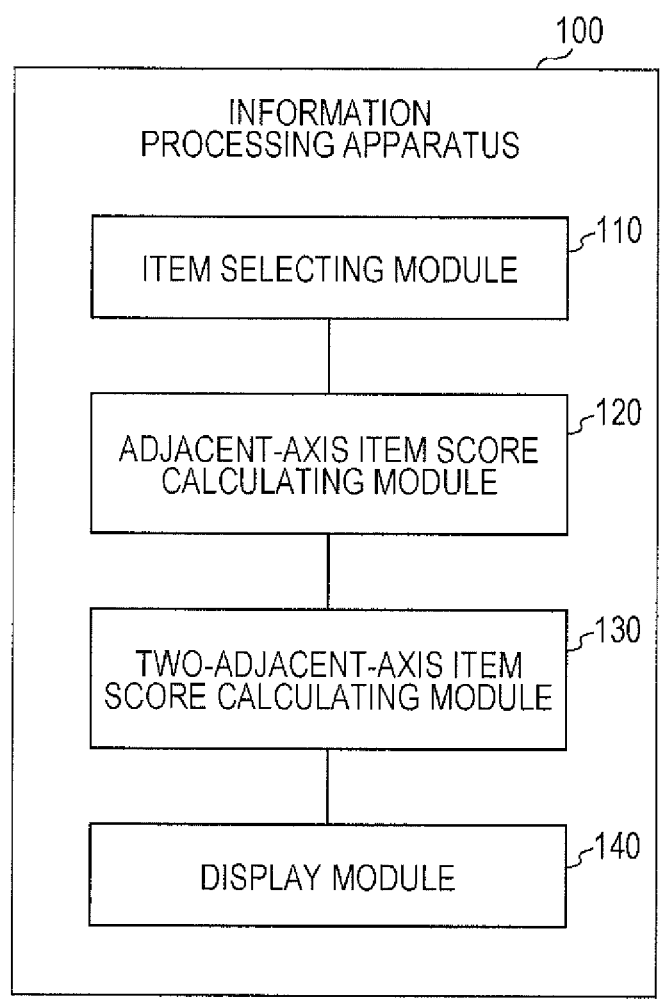
FIG. 1 is a block diagram illustrating conceptual modules forming an information processing apparatus according to a first exemplary embodiment.

Prior to a description of exemplary embodiments of the present invention, a technology which serves as a base of the exemplary embodiments will first be discussed. This discussion will be given for the purpose of easy understanding of the exemplary embodiments.

As the structure of a technology or a product becomes complicated, the number of cause-and-effect relationships between factors forming the technology or the product becomes increasing, and also, the cause-and-effect relationships are interacted with each other. It is thus difficult to understand the associations between factors. This may bring about the following problems.

(1) It takes time to find cause-and-effect relationships between factors of a technology or a product, thereby decreasing the efficiency in designing and developing the technology or the product.

(2) It is more likely to overlook a problem, and when a problem is found, a designing or developing process has to be suspended and reexamined.

(3) if manufacturing of a product continues without realizing the existence of a problem, quality problems occur.

(4) If an unexpected problem occurs, it takes time to construct a technology for analyzing a phenomenon of the problem, which causes a delay in addressing the problem.

One of the measures to be taken against the above-described problems which may effectively function is a method of analyzing and visualizing factors based on Quality Function Deployment (QFD).

QFD is a method for clarifying targets, problems, and actions to be taken so that customer/client requirements in terms of the quality can be reflected in product manufacturing in various stages, such as product planning, product developing, etc.

A typical form of QFD is a matrix indicating relationships between items of "quality requirements" extracted from items of customer/client requirements and items of "quality characteristics" extracted from factors to be considered in terms of a technology. QFD may also represent relationships between items of "quality requirements" or items of "quality characteristics" in the form of a triangle attic. By applying weights to items of "quality requirements", items of "planning requirements" (indicating which characteristics will satisfy customers/clients) may be extracted. Also, by associating items of "quality characteristics" with product design values, items of "design requirements" (product specifications) can be extracted. As a result of examining the above-described relationships, relationships among targets, problems, and actions to be taken can be clarified. That is, a QFD chart is a chart in which plural item lists are deployed on axes orthogonal to each other and cause-and-effect relationships between items on adjacent axes are represented in the form of a matrix.

In order to improve QFD, the following proposal has been made. Not only the use of items of "quality requirements" and "quality characteristics", but also various deployments, such as "function deployment", "parts deployment", "technology deployment", and "task deployment", are performed according to the circumstances, and then, obtained cause-and-effect relationships between items are represented by two-dimensional tables. Moreover, a computer program for displaying these tables is produced, and the items and matrix cells are linked to information on a network, thereby utilizing QFD as a frame for storing and sharing information.

However, some products, such as printers and medical instruments, function in a complicated manner such that many parts/members and plural physical phenomena are interrelated with each other. In the development of such a product, there are a huge number of items to be handled, and also, it is difficult to sufficiently describe relationships between design characteristics and quality requirements by using a simple frame, such as a combination of "quality requirements" and "quality characteristics" or a combination of "parts deployment" and "technology deployment". Moreover, a process for manufacturing a product is established in coordination of many departments, such as technology development, parts/members development, system development, and manufacturing departments. Accordingly, two-dimensional tables may be created, and symbols representing that "these items may be related" and "these items may not be related" may be assigned. However, unless the entire relationships between design characteristics and quality requirements including a mechanism of a phenomenon "why these items may be related" or "why these items may not be related" can be understood at a glance, it is difficult to utilize QFD in an actual designing and developing process. That is, the manufacturing steps for parts and members and the quality of a manufactured product are indirectly related to each other with various intermediate characteristics therebetween. Unless tables having appropriate intermediate characteristics and configurations are provided, it is difficult to clarify relationships between the manufacturing steps and the quality. The product design conditions and the product quality are also indirectly related to each other with various intermediate characteristics therebetween. Unless tables having appropriate intermediate characteristics and configurations are provided, it is difficult to clarify the relationships between the design conditions and the quality.

Additionally, in many cases, the definition of intermediate characteristics is ambiguous, which makes it difficult to standardize QFD charts. As a result, the use of QFD charts in an actual designing and developing process has not been promoted.

The above-described problems may be addressed by preparing a system which implements the following operations. A cause-and-effect relationship table having axes indicating appropriately defined intermediate characteristics is created. Then, such cause-and-effect relationships are displayed such that the entire relationships between intermediate characteristics can be observed at a glance. The input of items, which are likely to be numerous, positioned on an axis and formation and display of matrices can also be easily performed.

However, when items become numerous and cause-and-effect relationships between items become complicated, the following problem occurs. When a condition associated with one item is changed, it is necessary to examine which items will be influenced by this change, or in order to change the value of one item, it is necessary to examine which conditions have to be changed. In this case, if an operator checks cause-and-effect relationships only on a table, it is likely that the operator will inadvertently omit some check points. The reason for this is as follows. If one item is changed, such a change causes intermediate characteristics of plural items to be changed, and then, a change in each of the intermediate characteristics causes other plural items to be changed. It is thus difficult to trace influences caused by a change in one item. Moreover, when a certain design condition is changed in order to improve a certain quality, another quality may be decreased. This problem often occurs in the process of developing a product. In order to check secondary influences caused by a change in one item, it is necessary to trace, on a table, the manner in which influences caused by this change spread and then to trace back the influences caused by this change, which makes such work more complicated. Even if it is possible that an operator carefully trace a route in which influences caused by a change in one item spread without inadvertently omitting some check points, it is difficult to indicate such influences on a large table having numerous items. As a result, omissions of some check points occur, thereby adversely influencing the development period or quality.

Exemplary embodiments of the present invention will be described below with reference to the accompanying drawings.

FIG. 1 is a block diagram illustrating conceptual modules forming an information processing apparatus 100 according to a first exemplary embodiment.

Generally, modules are software (computer programs) components or hardware components that can be logically separated from one another. Accordingly, the modules of exemplary embodiments of the invention are not only modules of a computer program, but also modules of a hardware configuration. Thus, the exemplary embodiments will also be described in the form of a computer program for allowing a computer to function as those modules (a program for causing a computer to execute program steps, a program for allowing a computer to function as corresponding units, a computer program for allowing a computer to implement corresponding functions), a system, and a method. While expressions such as "store", "storing", "being stored", and equivalents thereof are used for the sake of description, such expressions indicate, when the exemplary embodiments relate to a computer program, storing the computer program in a storage device or performing control so that the computer program is stored in a storage device. Modules may correspond to functions based on a one-on-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationship among data elements, etc.). The term "predetermined" means being determined prior to a certain operation, and includes the meaning of being determined prior to a certain operation before starting processing of the exemplary embodiments, and also includes the meaning of being determined prior to a certain operation even after starting processing of the exemplary embodiments, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether case A is satisfied, and B is performed if it is determined that case A is satisfied", unless such a determination is necessary.

A system or an apparatus may be realized by connecting plural computers, hardware units, devices, etc., to one another via a communication medium, such as a network (including communication based on a one-on-one correspondence), or may be realized by a single computer, hardware unit, device, etc. The terms "apparatus" and "system" are used synonymously. The term "system" does not include merely a man-made social "mechanism" (social system).

Additionally, every time an operation is performed by using a corresponding module or every time each of plural operations is performed by using a corresponding module, target information is read from a storage device, and after performing the operation, a processed result is written into the storage device. Accordingly, a description of reading from the storage device before an operation or writing into the storage device after an operation may be omitted. Examples of the storage device may be a hard disk, a random access memory (RAM), an external storage medium, a storage device using a communication line, a register within a central processing unit (CPU), etc.

The information processing apparatus 100 of the first exemplary embodiment includes, as shown in FIG. 1, an item selecting module 110, an adjacent-axis item score calculating module 120, a two-adjacent-axis item score calculating module 130, and a display module 140.

The information processing apparatus 100 is utilized for supporting design and development in order to improve the efficiency in developing technologies and products and also to enhance the qualities of technologies and products. More specifically, the information processing apparatus 100 is utilized for checking, when there is a partial design change, influences on other items caused by this change by using a QFD chart.

The item selecting module 110 is connected to the adjacent-axis item score calculating module 120. The item selecting module 110 selects, through a selecting operation performed by a user, an item described in a QFD chart. The QFD chart includes at least three axes, and items are associated with each of the axes. Between two axes of the QFD chart, a matrix indicating cause-and-effect relationships between items is deployed.

Figure 3:
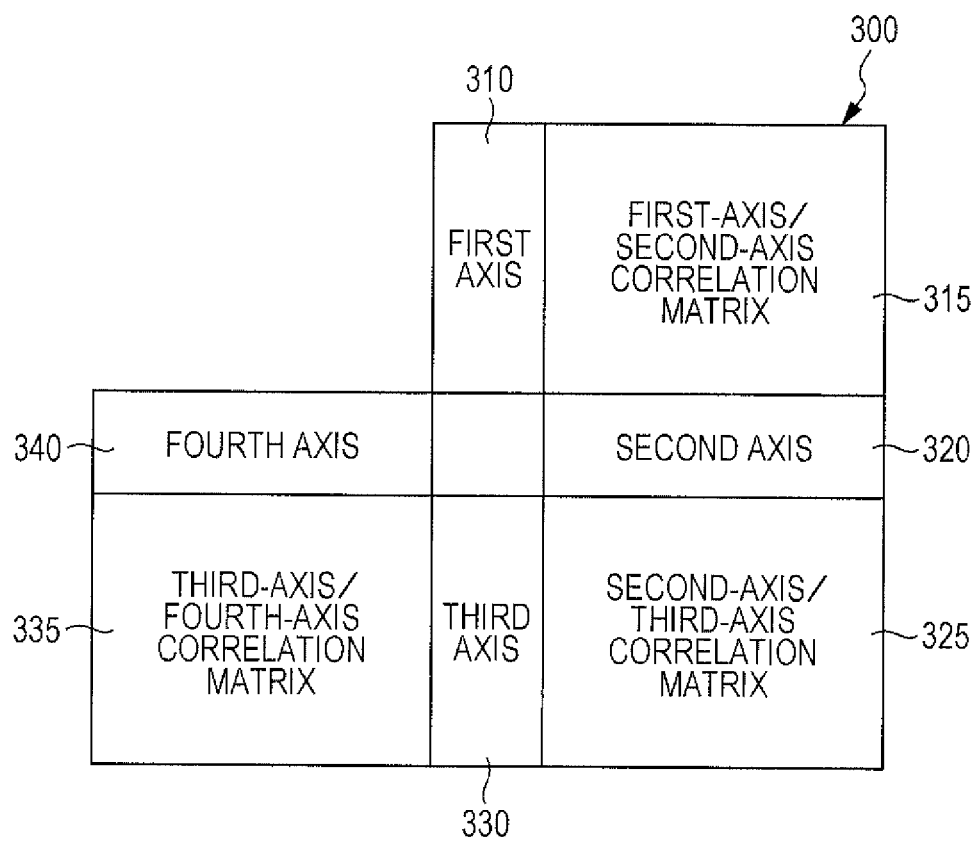
FIG. 3 illustrates an example of a Quality Function Deployment (QFD) chart to be processed by the first exemplary embodiment.

An example of such a QFD chart is a QFD chart 300 shown in FIG. 3. In this example, as a QFD chart including three or more axes, a QFD chart having four axes is shown. More specifically, the QFD chart 300 is constituted by four axes (a first axis 310, a second axis 320, a third axis 330, and a fourth axis 340). In each of the first through fourth axes 310 through 340, an axis name of an associated axis is indicated. Each of the first through fourth axes 310 through 340 includes at least one item, and an item name is appended to the item. For example, as the name of the first axis 310, "quality" is appended, as the name of the second axis 320, "performance" is appended, as the name of the third axis 330, "structures and physical properties" is appended, and as the name of the fourth axis 340, "production conditions" is appended. Items are associated with the first axis 310, and as the names of these items, for example, "cooks quickly and cooks large quantities", "easy to use", etc., are appended.

A first-axis/second-axis correlation matrix 315 is provided between the first axis 310 and the second axis 320. A second-axis/third-axis correlation matrix 325 is provided between the second axis 320 and the third axis 330. A third-axis/fourth-axis correlation matrix 335 is provided between the third axis 330 and the fourth axis 340. That is, the first-axis/second-axis correlation matrix 315 is defined by the first axis 310 and the second axis 320. The second-axis/third-axis correlation matrix 325 is defined by the second axis 320 and the third axis 330. The third-axis/fourth-axis correlation matrix 335 is defined by the third axis 330 and the fourth axis 340. QFD charts will be described later more specifically with reference to FIGS. 19 and 20.

An example of a QFD chart having three axes may be a QFD chart constituted by the first axis 310, the second axis 320, and the third axis 330 or a QFD chart constituted by the second axis 320, the third axis 330, and the fourth axis 340.

The selection of an item described in a QFD chart is performed as follows. A QFD chart is displayed on a display device, such as a display, and an operator selects an item within an axis of the QFD chart by using a mouse, a touch panel, etc. The creation and display of a QFD chart will be discussed later with reference to FIGS. 13 through 18.

Axis names, item names, and a data structure indicating relationships between the axis names and item names will be discussed later with reference to an example shown in FIG. 15.

The adjacent-axis item score calculating module 120 is connected to the item selecting module 110 and the two-adjacent-axis item score calculating module 130. The adjacent-axis item score calculating module 120 calculates a correlation score between a first item selected by the item selecting module 110 and an item associated with an axis adjacent to the axis of the first item. Then, the adjacent-axis item score calculating module 120 compares the calculated correlation score with a predetermined value, and, upon calculation results, extracts a second item related to the first item. If there are two axes which are adjacent to the axis of the first item, calculations may be made on items associated with one of these axes or both of these axes. For example, in the QFD chart 300 shown in FIG. 3, if an item associated with the second axis 320 is selected, an axis adjacent to the second axis 320 is the first axis 310 or the third axis 330. Then, both of the first axis 310 and the third axis 330 or only one of the first axis 310 and the third axis 330 may be used for calculating processing. If only one of the axes is used, it may be selected through a selecting operation performed by an operator, or a predetermined axis (e.g., an axis which is positioned clockwise with respect to a selected axis) may be selected.

A correlation score is calculated by using a symbol or a numeric value indicated within an element (cell) of a matrix between two axes. The symbol or the numeric value indicates a cause-and-effect relationship between two items associated with different axes. If a positive cause-and-effect relationship is strong, a red double circle, for example, is input in a cell as a symbol, and if a negative cause-and-effect relationship is strong, a blue double circle, for example, is input in a cell as a symbol. Symbols may be input by an operator, or may have been input in advance, such as in a case in which an already created QFD chart is used. Then, a table in which symbols are associated with numeric values (e.g., a table indicated in an influence prediction coefficient area 430, which will be discussed later, shown in FIG. 4) is prepared, and symbols are converted into numeric values, thereby calculating correlation scores according to a predetermined mathematical expression. According to the mathematical expression, values converted from symbols within cells of an item corresponding to an item selected by the item selecting module 110 may be added or multiplied.

The two-adjacent-axis item score calculating module 130 is connected to the adjacent-axis item score calculating module 120 and the display module 140. The two-adjacent-axis item score calculating module 130 calculates a correlation score between the second item extracted by the adjacent-axis item score calculating module 120 and an item associated with an axis adjacent to the axis of the second item, and determines the calculated correlation score to be a correlation score between such an item associated with the adjacent axis and the first item. Then, the two-adjacent-axis item score calculating module 130 compares the calculated correlation score with a predetermined value, and extracts a third item related to the first item on the basis of comparison results.

"An axis adjacent to the axis of the second item" is set to be an axis which is not the axis of the first item. Then, the direction in which the adjacent axis is subjected to this calculating processing for the second time onward is set to be the same direction as that set in the calculating processing executed for the first time. That is, once the direction of the adjacent axis is decided, it will not be changed to the opposite direction (the direction in which the calculating processing returns to the axis which has already been subjected to the calculating processing).

The information processing apparatus 100 may perform control so that the two-adjacent-axis item score calculating module 130 will execute calculating processing more than one time by setting the third item extracted by the two-adjacent-axis item score calculating module 130 as the second item. Hereinafter such processing will be referred to as "repetition processing".

After the repetition processing executed by the two-adjacent-axis item score calculating module 130 has been completed, the information processing apparatus 100 may perform control so that the two-adjacent-axis item score calculating module 130 will execute calculating processing on items associated with an adjacent axis in the opposite direction (backward direction) at least one time. In this case, the two-adjacent-axis item score calculating module 130 may execute this repetition processing in the opposite direction until the processing is executed on the axis of the item selected by the item selecting module 110 (i.e., until the processing returns to the axis of the item selected by the item selecting module 110). Alternatively, the number of repetition times may be determined in advance or whenever necessary according to an instruction from an operator.

The display module 140 is connected to the two-adjacent-axis item score calculating module 130. The display module 140 displays first, second, and third items within a QFD chart in a mode different from that of the other items. For example, the backgrounds of the first, second, and third items may be displayed in, for example, red, while the background of the other items may be displayed in white. The colors of the first, second, and third items may be changed in accordance with the calculated correlation scores.

When the two-adjacent-axis item score calculating module 130 performs calculating processing plural times, the display module 140 may display first and second items and items extracted by the two-adjacent-axis item score calculating module 130 in a mode different from that of the other items.

The display module 140 may display a QFD chart constituted by only first and second items and items extracted by the two-adjacent-axis item score calculating module 130. A specific example of such display processing will be discussed later with reference to FIG. 10.

Figure 2:
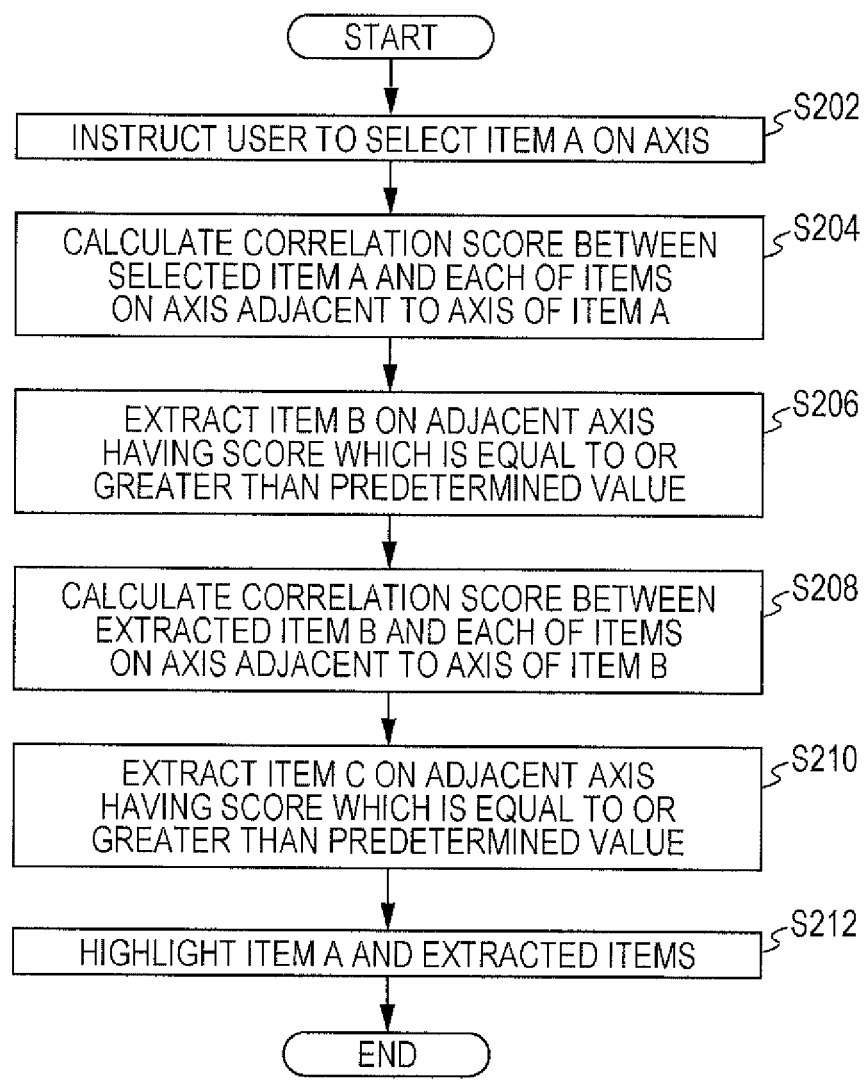
FIG. 2 is a flowchart illustrating an example of processing according to the first exemplary embodiment.
Figure 4:
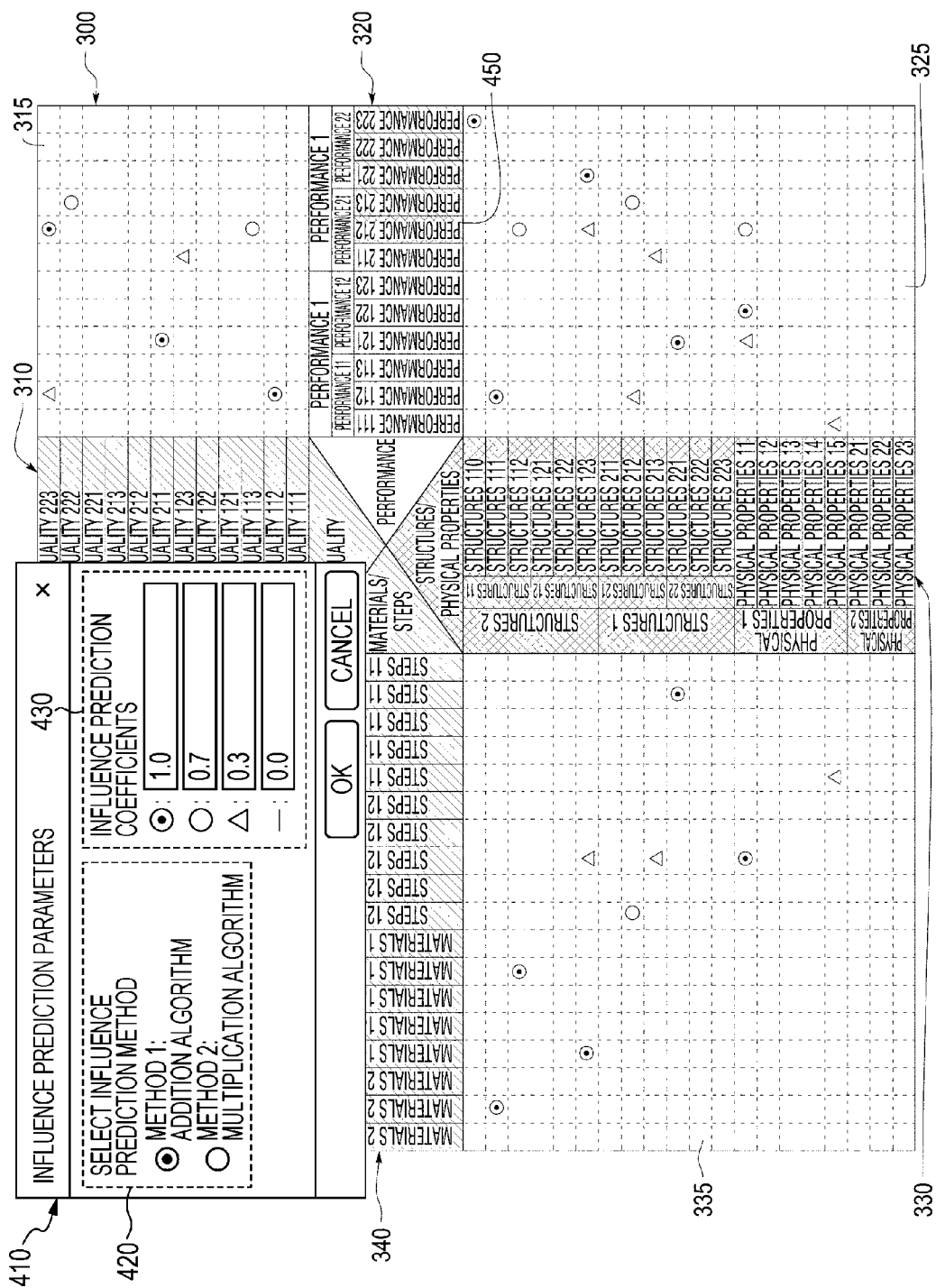
FIG. 4 illustrates an example of processing performed by an item selecting module and an adjacent-axis item score calculating module of the first exemplary embodiment.
Figure 5:
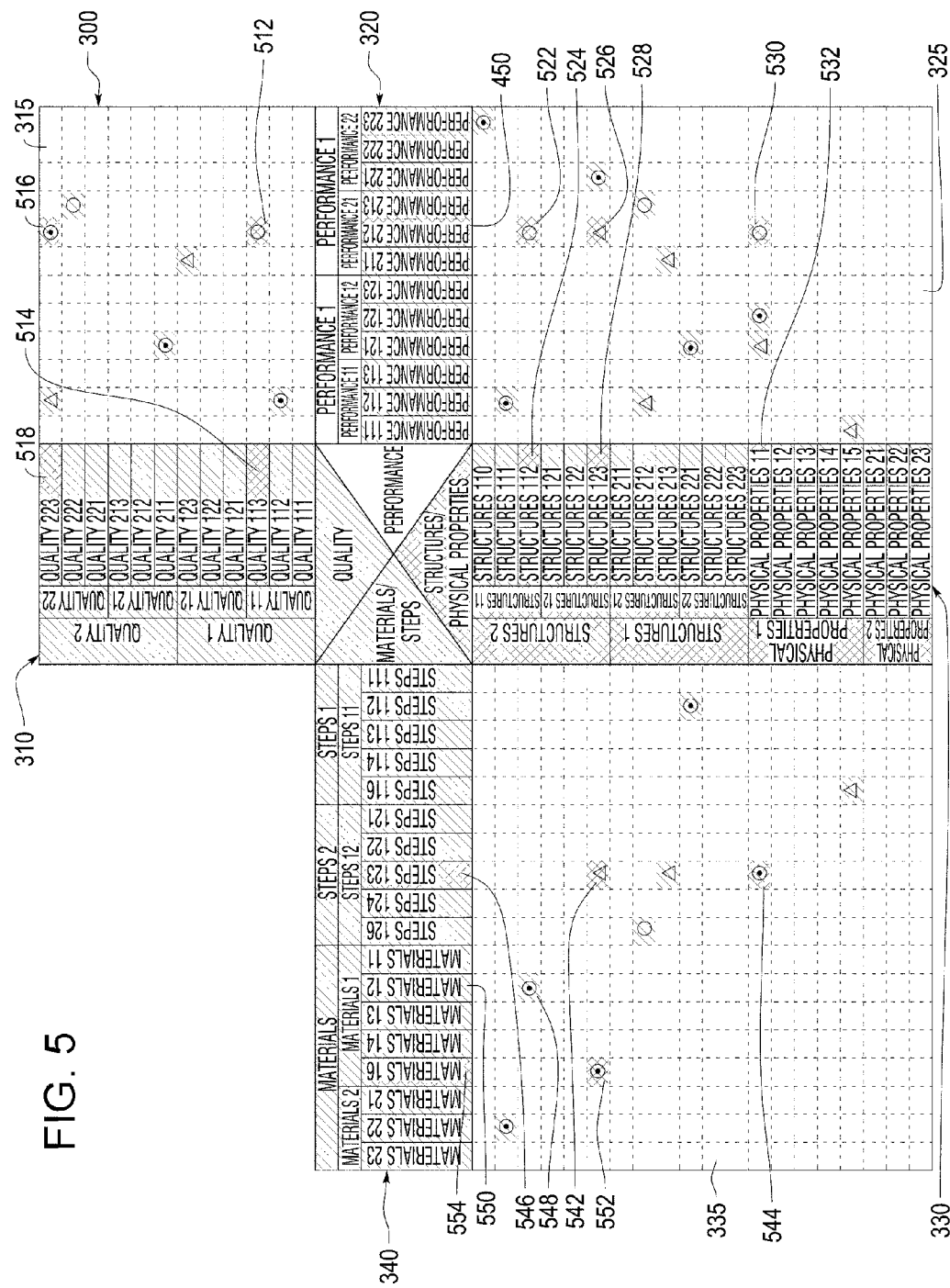
FIG. 5 illustrates an example of processing performed by the adjacent-axis item score calculating module, an two-adjacent-axis item score calculating module, and a display module of the first exemplary embodiment.

FIG. 2 is a flowchart illustrating an example of processing according to the first exemplary embodiment. This processing will be described below with reference to FIGS. 4 and 5. FIG. 4 illustrates an example of processing performed by the item selecting module 110 and the adjacent-axis item score calculating module 120 of the first exemplary embodiment. FIG. 5 illustrates an example of processing performed by the adjacent-axis item score calculating module 120, the two-adjacent-axis item score calculating module 130, and the display module 140 of the first exemplary embodiment.

In step S202, the item selecting module 110 instructs a user to select an item A on an axis. As shown in the example of FIG. 4, it is assumed that the user has selected an item 450 within the second axis 320. Then, by using an influence prediction parameter setting area 410, a mathematical expression for calculating correlation scores and an association table for converting symbols indicated within cells of a matrix into numeric values are set. An influence prediction method selecting area 420 is an area in which the selection of the above-described mathematical expression is received. The influence prediction coefficient area 430 is an area in which an association table used for converting symbols (e.g., a red double circle) indicated within cells of a matrix into numeric values is set. These settings are set as a result of a user operating a mouse, a keyboard, etc.

In step S204, the adjacent-axis item score calculating module 120 calculates a correlation score between the selected item A and each of items on an axis adjacent to the axis of the item A. To explain this process more specifically with reference to FIG. 4, the correlation score between the selected item 450 and each of the items on the first axis 310 and the third axis 330 adjacent to the second axis 320 of the selected item 450 is calculated by using symbols indicated within the cells of the first-axis/second-axis correlation matrix 315 and the second-axis/third-axis correlation matrix 325, respectively. In this case, as indicated by the example shown in FIG. 5, cells used for calculating correlation scores with the selected item 450 in the first-axis/second-axis correlation matrix 315 provided between the second axis 320 and the first axis 310 are a cell 512 indicating a cause-and-effect relationship between the selected item 450 and an item 514 and a cell 516 indicating a cause-and-effect relationship between the selected item 450 and an item 518. As indicated by the example shown in FIG. 5, cells used for calculating correlation scores with the selected item 450 in the second-axis/third-axis correlation matrix 325 provided between the second axis 320 and the third axis 330 are a cell 522 indicating a cause-and-effect relationship between the selected item 450 and an item 524, a cell 526 indicating a cause-and-effect relationship between the selected item 450 and an item 528, and a cell 530 indicating a cause-and-effect relationship between the selected item 450 and an item 532.

It is noted that the calculating processing includes converting from symbols within cells into numeric values. Two or more values converted from symbols within cells are added or multiplied in a case where items are formed in a hierarchical structure and a correlation score with an item of a higher level including plural lower levels in the hierarchical structure is calculated.

In step S206, the adjacent-axis item score calculating module 120 extracts an item B on an adjacent axis having a correlation score which is equal to or greater than a predetermined value. The predetermined value is, for example, 0.1. In the example shown in FIG. 5, items to be extracted are items 518, 514, 524, 528, and 532. If scores take positive or negative values in accordance with the positive or negative sign of correlation, a certain condition may be set, such as that the absolute value of a score is found or the score is a value other than 0.

In step S208, the two-adjacent-axis item score calculating module 130 calculates a correlation score between the item B and each of items on an axis adjacent to the axis of the item B. In this case, the adjacent axis is the fourth axis 340 adjacent to the third axis 330. Correlation scores are not calculated on the items B on the first axis 310 since there is no matrix between the first axis 310 and the fourth axis 340. That is, "two axes are adjacent to each other" means that it is necessary that a matrix exist between the two adjacent axes.

The items B on the third axis 330 are plural items, that is, the items 524, 528, and 532. As indicated by the example shown in FIG. 5, cells for calculating correlation scores with the items 524, 528, and 532 in the third-axis/fourth-axis correlation matrix 335 provided between the third axis 330 and the fourth axis 340 are a cell 548 indicating a cause-and-effect relationship between the item 524 and an item 550, a cell 542 indicating a cause-and-effect relationship between the item 528 and an item 546, a cell 552 indicating a cause-and-effect relationship between the item 528 and an item 554, and a cell 544 indicating a cause-and-effect relationship between the item 532 and the item 546.

In step S210, the two-adjacent-axis item score calculating module 130 extracts an item C on the adjacent axis having a correlation score which is equal to or greater than a predetermined value. The predetermined value is, for example, 0.1. In this case, the predetermined value may be different from the predetermined value used in step S206 (i.e., the predetermined value used in the processing performed by the adjacent-axis item score calculating module 120). For example, the predetermined value may be changed depending on the position of the item on the adjacent axis, e.g., a higher value may be used as the item C is farther away from the axis of the selected item. The reason for this is to prevent items having a low correlation score with the selected item from being selected. In the example shown in FIG. 5, items to be extracted are the items 546, 550, and 554.

In step S212, the display module 140 highlights the item A and the extracted items. In the example shown in FIG. 5, the selected item 450 and the items 518, 514, 524, 528, 532, 546, 550, and 554 are displayed in a color different from the color of the other items.

Figure 6:
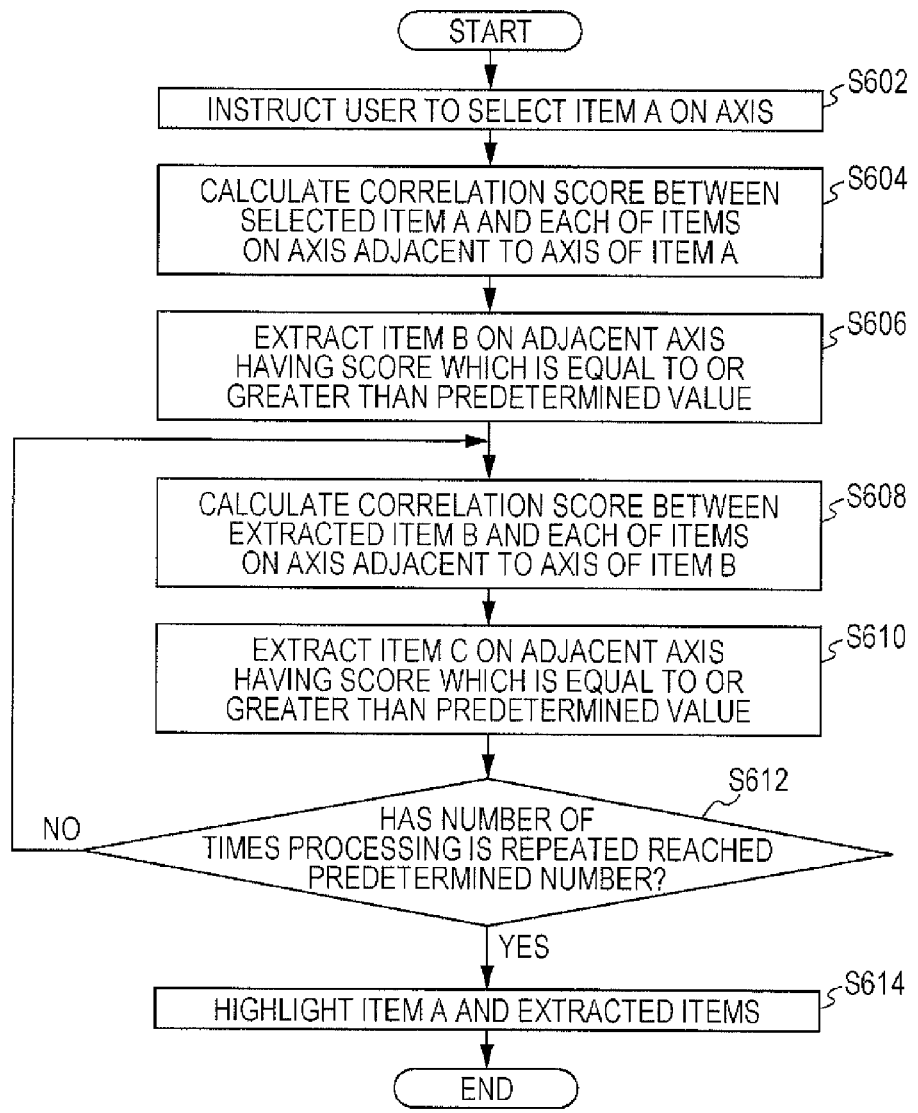
FIG. 6 is a flowchart illustrating an example of processing according to the first exemplary embodiment.

FIG. 6 is a flowchart illustrating an example of processing according to the first exemplary embodiment. In the flowchart shown in FIG. 6, step S612 is added to the steps of the flowchart shown in FIG. 2. More specifically, step S612 is executed after step S210. That is, steps S208 and S210 are repeated. In the flowchart shown in FIG. 2, correlation scores are calculated up to a two-adjacent axis from an axis including an item selected by the item selecting module 110. However, in the flowchart shown in FIG. 6, correlation scores are calculated up to a three-adjacent axis from an axis including an item selected by the item selecting module 110 (up to four-adjacent axis or more if the number of times in steps S608 and S610 are repeated two times or more). The processing in the flowchart shown in FIG. 6 is executed on a four-axis QFD chart. However, a five-axis QFD chart or a QFD chart having a greater number of axes may be subjected to this processing. The other steps except for step S612 are similar to those shown in FIG. 2.

In step S602, the item selecting module 110 instructs a user to select an item A on an axis.

In step S604, the adjacent-axis item score calculating module 120 calculates a correlation score between the selected item A and each of items on an axis adjacent to the axis of the item A.

In step S606, the adjacent-axis item score calculating module 120 extracts an item B which is positioned on an axis adjacent to the axis of the selected item A and has a correlation score which is equal to or greater than a predetermined value.

In step S608, the two-adjacent-axis item score calculating module 130 calculates a correlation score between the extracted item B and each of the items on an axis adjacent to the axis of the extracted item B. In this case, the extracted item B is the item B extracted in step S606 if step S608 is executed for the first time. However, if step S608 is executed for the second time onward, the extracted item B is the item extracted in step S610 (the latest item extracted in step S610 in the repetition processing). The definition of the extracted item B also applies to the flowcharts of FIGS. 7 through 11.

In step S610, the two-adjacent-axis item score calculating module 130 extracts an item C which is positioned on an axis adjacent to the axis of the selected items B and has a correlation score which is equal to or greater than a predetermined value.

In step S612, the two-adjacent-axis item score calculating module 130 determines whether the number of times the processing is repeated has reached a predetermined number. If the result of step S612 is YES, the process proceeds to step S614. If the result of step S612 is NO, the process returns to step S608.

In step S614, the display module 140 highlights the item A and the extracted items.

Figure 7:
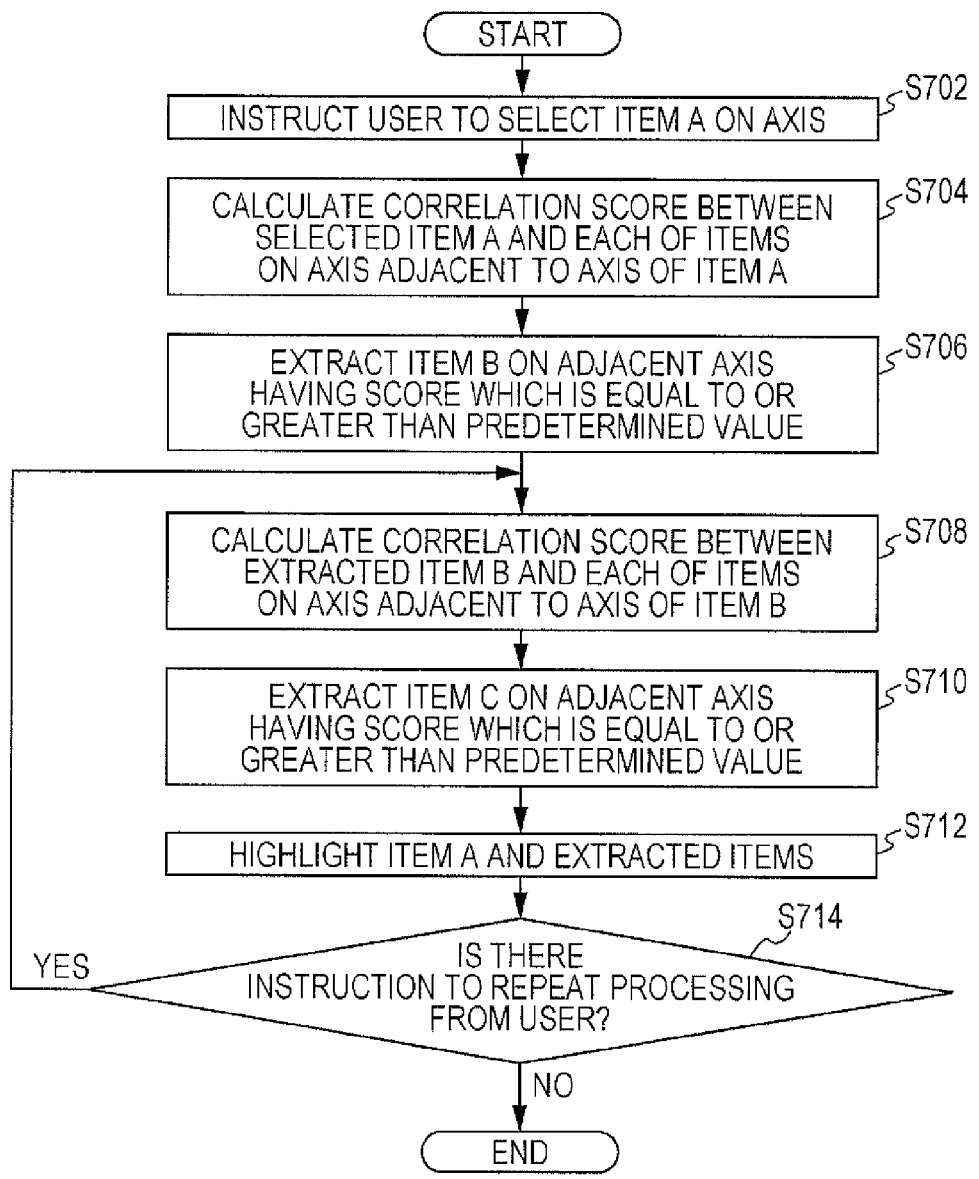
FIG. 7 is a flowchart illustrating an example of processing according to the first exemplary embodiment.

FIG. 7 is a flowchart illustrating an example of processing according to the first exemplary embodiment. In the flowchart shown in FIG. 7, step S714 is added to the steps of the flowchart shown in FIG. 2. More specifically, step S714 is added after step S212. That is, steps S208 through S212 are repeated, and as in the flowchart shown in FIG. 6, correlation scores are calculated up to a three-adjacent axis or a greater axis number from an axis including an item selected by the item selecting module 110. Additionally, every time calculating processing and extracting processing are executed, a selected item and extracted items are displayed in step S712. The reason for this is to allow a user to check results every time processing proceeds to a new axis. The other steps except for step S714 are similar to those shown in FIG. 2.

In step S702, the item selecting module 110 instructs a user to select an item A on an axis.

In step S704, the adjacent-axis item score calculating module 120 calculates a correlation score between the selected item A and each of items on an axis adjacent to the axis of the item A.

In step S706, the adjacent-axis item score calculating module 120 extracts an item B which is positioned on the adjacent axis and has a correlation score which is equal to or greater than a predetermined value.

In step S708, the two-adjacent-axis item score calculating module 130 calculates a correlation score between the extracted item B and each of the items on an axis adjacent to the axis of the extracted item B.

In step S710, the two-adjacent-axis item score calculating module 130 extracts an item C which is positioned on the adjacent axis and has a correlation score which is equal to or greater than a predetermined value.

In step S712, the display module 140 highlights the item A and the extracted items.

In step S714, the two-adjacent-axis item score calculating module 130 determines whether a user has given an instruction to repeat the processing. If the result of step S714 is YES, the process returns to step S708. If the result of step S714 is NO, the processing is terminated.

Figure 8:
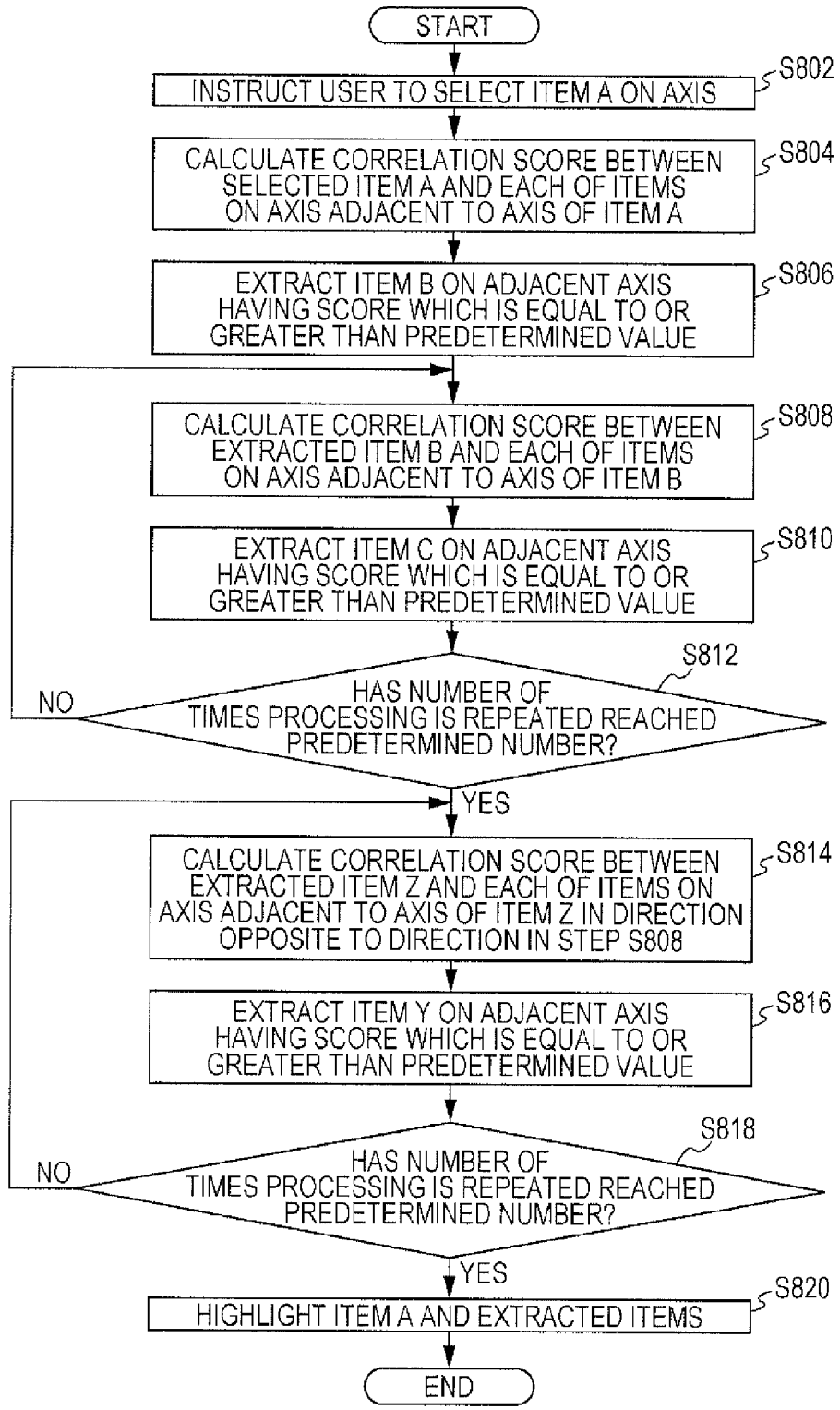
FIG. 8 is a flowchart illustrating an example of processing according to the first exemplary embodiment.

FIG. 8 is a flowchart illustrating an example of processing according to the first exemplary embodiment. In the flowchart shown in FIG. 8, steps S814 through S818 are added to the steps of the flowchart shown in FIG. 6. More specifically, steps S814 through S818 are added after step S612. That is, in steps S814 through S818, correlation scores are calculated in a backward direction. This is performed for checking, if there is a design change in an item extracted before step S814, how such a change is related to an item selected by the item selecting module 110 and the other items in the backward direction. The other steps except for steps S814 through S818 are similar to those shown in FIG. 6.

In step S802, the item selecting module 110 instructs a user to select an item A on an axis.

In step S804, the adjacent-axis item score calculating module 120 calculates a correlation score between the selected item A and each of items on an axis adjacent to the axis of the item A.

In step S806, the adjacent-axis item score calculating module 120 extracts an item B which is positioned on the adjacent axis and has a correlation score which is equal to or greater than a predetermined value.

In step S808, the two-adjacent-axis item score calculating module 130 calculates a correlation score between the extracted item B and each of the items on an axis adjacent to the axis of the extracted item B.

In step S810, the two-adjacent-axis item score calculating module 130 extracts an item C which is positioned on the adjacent axis and has a correlation score which is equal to or greater than a predetermined value.

In step S812, the two-adjacent-axis item score calculating module 130 determines whether the number of times the processing is repeated has reached a predetermined number. If the result of step S812 is YES, the process proceeds to step S814. If the result of step S812 is NO, the process returns to step S808.

In step S814, the two-adjacent-axis item score calculating module 130 calculates a correlation score between an extracted item Z and each of the items on an axis adjacent to the axis of the item Z in the direction opposite to the direction in which the calculating processing is executed in step S808. In this case, the item Z is the item extracted immediately before step S814. If the direction in which the calculating processing proceeds in step S808 is the clockwise direction, the opposite direction is the counterclockwise direction, that is, the opposite direction is a backward direction in which the calculating processing returns to the axis including the item selected by the item selecting module 110. Steps S814 through S818 are similar to steps S808 through S812, respectively, except that the directions of calculating processing are opposite to each other.

In step S816, the two-adjacent-axis item score calculating module 130 extracts an item Y which is positioned on the adjacent axis and has a correlation score which is equal to or greater than a predetermined value.

In step S818, the two-adjacent-axis item score calculating module 130 determines whether the number of times the processing is repeated has reached a predetermined number. If the result of step S818 is YES, the process proceeds to step S820. If the result of step S818 is NO, the process returns to step S814.

In step S820, the display module 140 highlights the item A and the extracted items.

Figure 9:
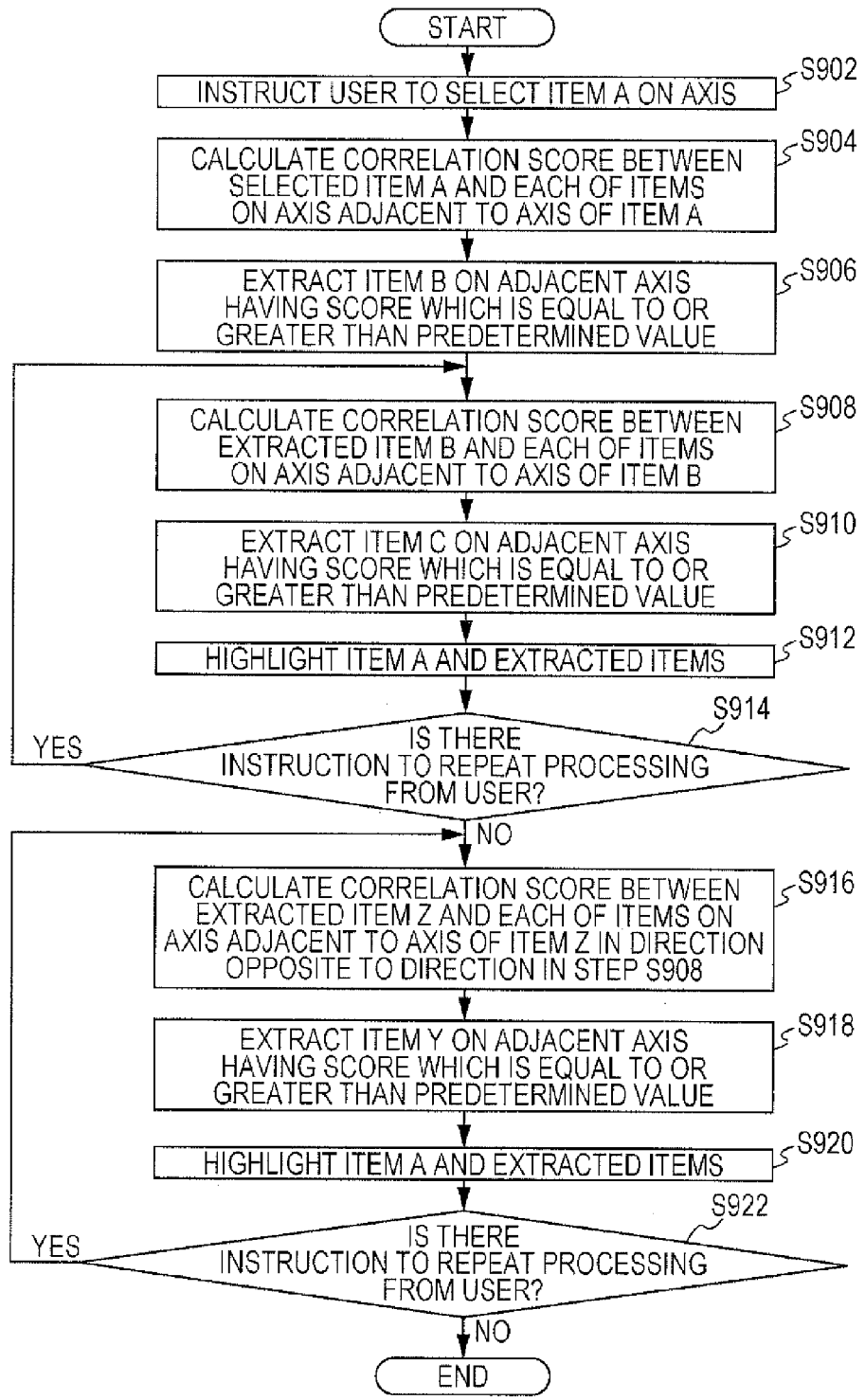
FIG. 9 is a flowchart illustrating an example of processing according to the first exemplary embodiment.

FIG. 9 is a flowchart illustrating an example of processing according to the first exemplary embodiment. In the flowchart shown in FIG. 9, steps S916 through S922 are added to the steps of the flowchart shown in FIG. 7. More specifically, steps S916 through S922 are added after step S714. That is, in steps S916 through S922, correlation scores are calculated in a backward direction. This is performed for checking, if there is a design change in an item extracted before step S916, how such a change relates to an item selected by the item selecting module 110 and the other items in the backward direction. The other steps except for steps S916 through S922 are similar to those shown in FIG. 7.

In step S902, the item selecting module 110 instructs a user to select an item A on an axis.

In step S904, the adjacent-axis item score calculating module 120 calculates a correlation score between the selected item A and each of items on an axis adjacent to the axis of the item A.

In step S906, the adjacent-axis item score calculating module 120 extracts an item B which is positioned on an axis adjacent to the axis of the selected item A and has a correlation score which is equal to or greater than a predetermined value.

In step S908, the two-adjacent-axis item: score calculating module 130 calculates a correlation score between the extracted item B and each of the items on an axis adjacent to the axis of the extracted item B.

In step S910, the two-adjacent-axis item score calculating module 130 extracts an item C which is positioned on the adjacent axis and has a correlation score which is equal to or greater than a predetermined value.

In step S912, the display module 140 highlights the item A and the extracted items.

In step S914, the two-adjacent-axis item score calculating module 130 determines whether a user has given an instruction to repeat the processing. If the result of step S914 is YES, the process returns to step S908. If the result of step S914 is NO, the process proceeds to step S916.

In step S916, the two-adjacent-axis item score calculating module 130 calculates a correlation score between an extracted item Z and each of the items on an axis adjacent to the axis of the item Z in the direction opposite to the direction in which the calculating processing is executed in step S908. In this case, the item Z is the item extracted immediately before step S916. If the direction in which the calculating processing proceeds in step S908 is the clockwise direction, the opposite direction is the counterclockwise direction, that is, the opposite direction is a backward direction in which the calculating processing returns to the axis including the item selected by the item selecting module 110. Steps S916 through S922 are similar to steps S908 through S914, respectively, except that the directions of calculating processing are opposite to each other.

In step S918, the two-adjacent-axis item score calculating module 130 extracts an item Y which is positioned on an axis adjacent to the axis of the extracted item Z and has a correlation score which is equal to or greater than a predetermined value.

In step S920, the display module 140 highlights the item A and the extracted items.

In step S922, the two-adjacent-axis item score calculating module 130 determines whether a user has given an instruction to repeat the processing. If the result of step S922 is YES, the process returns to step S916. If the result of step S922 is NO, the processing is terminated.

Figure 10:
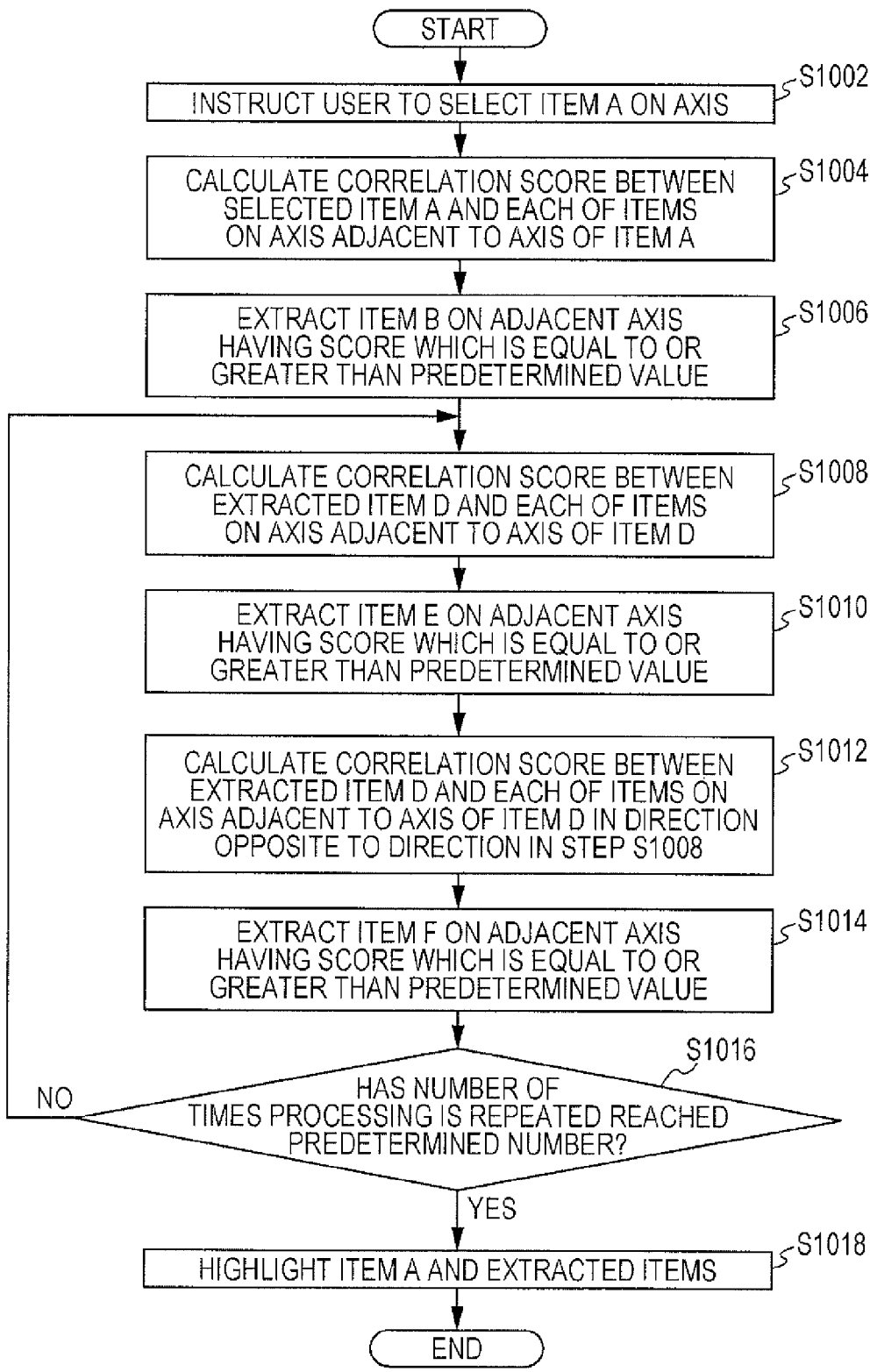
FIG. 10 is a flowchart illustrating an example of processing according to the first exemplary embodiment.

FIG. 10 is a flowchart illustrating an example of processing according to the first exemplary embodiment. In the flowchart in FIG. 8, after calculating processing and extracting processing are repeatedly executed a predetermined number of times in one direction, they are restarted in the opposite direction. In this example of processing in FIG. 10, every time calculating processing and extraction processing are executed one time in one direction, they are also executed in the other direction. The other steps are similar to those in FIG. 8.

In step S1002, the item selecting module 110 instructs a user to select an item A on an axis.

In step S1004, the adjacent-axis item score calculating module 120 calculates a correlation score between the selected item A and each of items on an axis adjacent to the axis of the item A.

In step S1006, the adjacent-axis item score calculating module 120 extracts an item B which is positioned on the adjacent axis and has a correlation score which is equal to or greater than a predetermined value.

In step S1008, the two-adjacent-axis item score calculating module 130 calculates a correlation score between an extracted item D and each of the items on an axis adjacent to the axis of the extracted item D.

In step S1010, the two-adjacent-axis item score calculating module 130 extracts an item E which is positioned on an axis adjacent to the axis of the selected items D and has a correlation score which is equal to or greater than a predetermined value.

In step S1012, the two-adjacent-axis item score calculating module 130 calculates a correlation score between the extracted item D and each of the items on an axis adjacent to the axis of the item D in the direction opposite to the direction in which the calculating processing is executed in step S1008.

In step S1014, the two-adjacent-axis item score calculating module 130 extracts an item F which is positioned on the adjacent axis and has a correlation score which is equal to or greater than a predetermined value.

In step S1016, the two-adjacent-axis item score calculating module 130 determines whether the number of times the processing is repeated has reached a predetermined number. If the result of step S1016 is YES, the process proceeds to step S1018. If the result of step S1016 is NO, the process returns to step S1008.

In step S1018, the display module 140 highlights the item A and the extracted items.

The item D in steps S1008 and S1012 is the item extracted as a result of executing step S1006 or steps S1010 and S1014.

As a result of calculating a correlation score in the opposite direction, a correlation score may have to be calculated again for an already extracted item. In this case, a new correlation score may be compared with a previously calculated correlation score, and a higher score may be used in accordance with a comparison result. Alternatively, a new score may be used.

Instead of calculating correlation scores a prescribed number of times, calculating processing may be repeated until there is no change in calculation results in a QFD chart.

Figure 11:
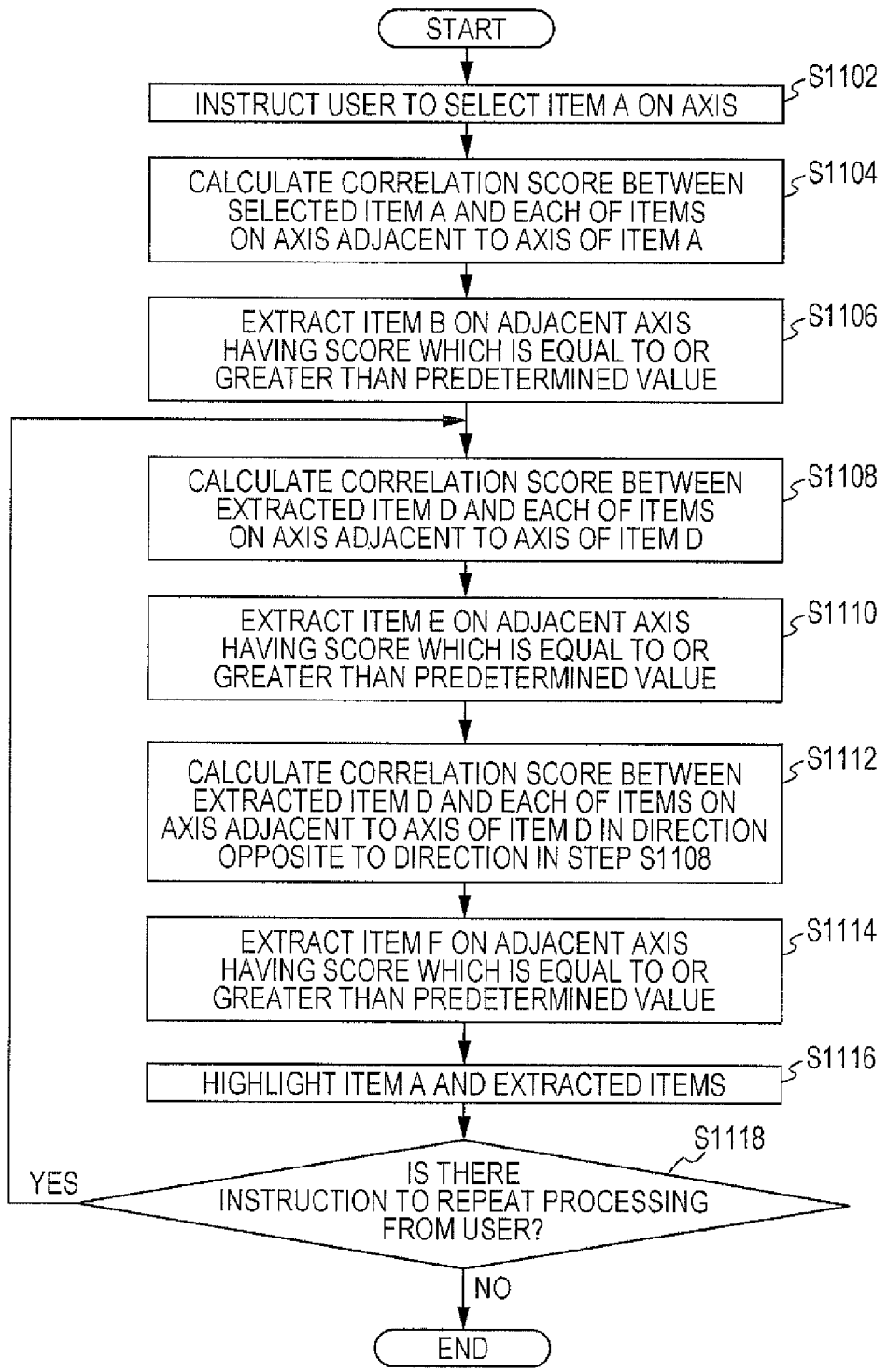
FIG. 11 is a flowchart illustrating an example of processing according to the first exemplary embodiment.

FIG. 11 is a flowchart illustrating an example of processing according to the first exemplary embodiment. In the flowchart in FIG. 9, after calculating processing and extracting processing are repeatedly executed in one direction, they are restarted in the opposite direction. In this example of processing in FIG. 11, every time calculating processing and extracting processing are executed in one direction in response to an instruction from a user, they are also executed in the opposite direction. The other steps are similar to those in FIG. 9.

In step S1102, the item selecting module 110 instructs a user to select an item A on an axis.

In step S1104, the adjacent-axis item score calculating module 120 calculates a correlation score between the selected item A and each of items on an axis adjacent to the axis of the item A.

In step S1106, the adjacent-axis item score calculating module 120 extracts an item B which is positioned on an axis adjacent to the axis of the selected item A and has a correlation score which is equal to or greater than a predetermined value.

In step S1108, the two-adjacent-axis item score calculating module 130 calculates a correlation score between an extracted item D and each of the items on an axis adjacent to the axis of the extracted item D.

In step S1110, the two-adjacent-axis item score calculating module 130 extracts an item E which is positioned on the adjacent axis and has a correlation score which is equal to or greater than a predetermined value.

In step S1112, the two-adjacent-axis item score calculating module 130 calculates a correlation score between the extracted item D and each of the items on an axis adjacent to the axis of the item D in the direction opposite to the direction in which the calculating processing is executed in step S1108.

In step S1114, the two-adjacent-axis item score calculating module 130 extracts an item F which is positioned on the adjacent axis and has a correlation score which is equal to or greater than a predetermined value.

In step S1116, the display module 140 highlights the item A and the extracted items.

In step S1118, the two-adjacent-axis item score calculating module 130 determines whether a user has given an instruction to repeat the processing. If the result of step S1118 is YES, the process returns to step S1108. If the result of step S1118 is NO, the processing is terminated.

The item D in steps S1108 and S1112 is the item extracted as a result of executing step S1106 or steps S1110 and S1114.

As a result of calculating a correlation score in the opposite direction, a correlation score may have to be calculated again for an already extracted item. In this case, a new correlation score may be compared with a previously calculated correlation score, and a higher score may be used in accordance with a comparison result. Alternatively, a new score may be used.

Figure 12:
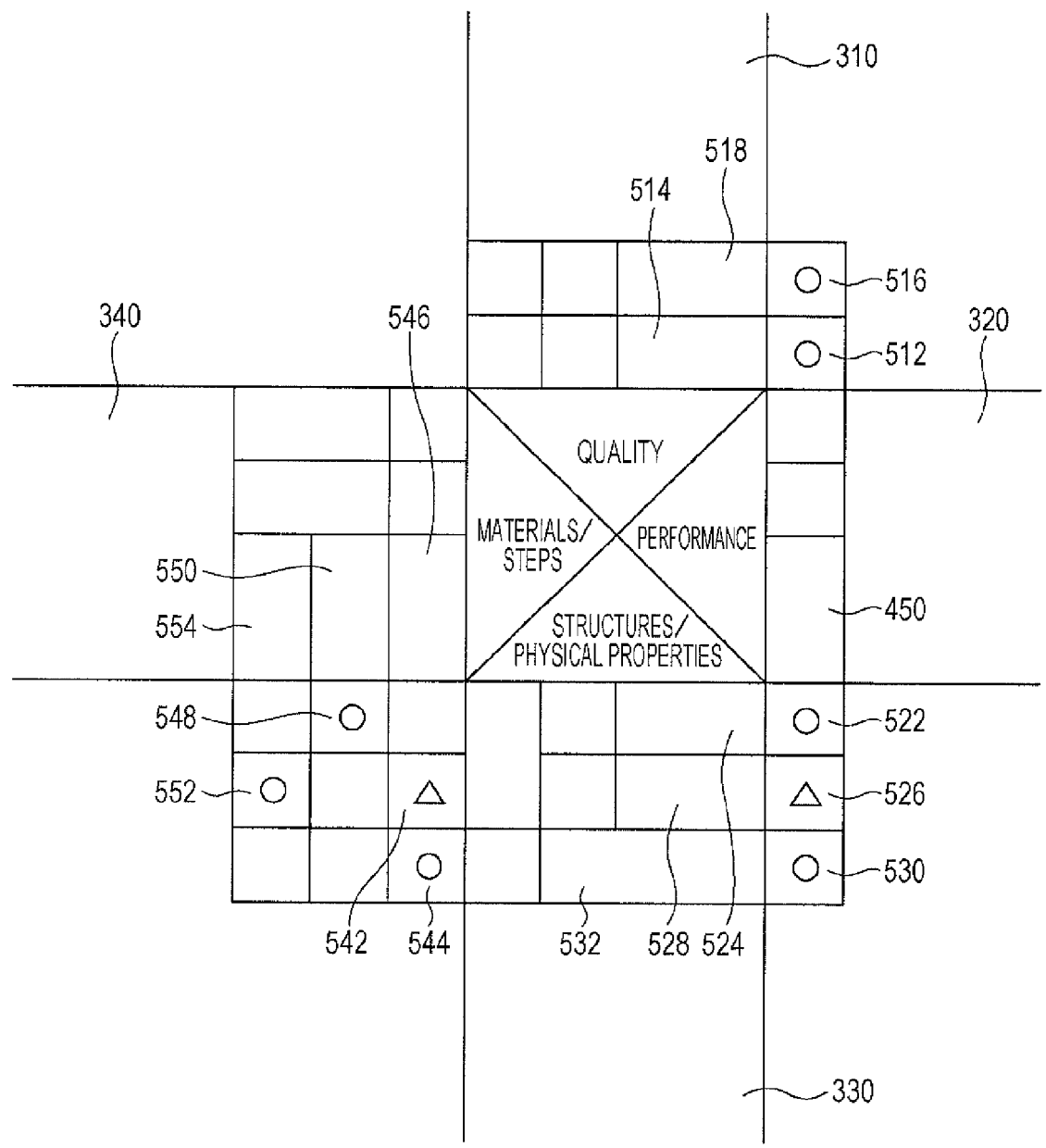
FIG. 12 illustrates an example of processing performed by the display module of the first exemplary embodiment.

FIG. 12 illustrates an example of processing performed by the display module 140 of the first exemplary embodiment. In the example shown in FIG. 5, extracted items are highlighted. However, as shown in FIG. 12, only extracted items may be removed, and a QFD chart including the removed items may be generated. In the example shown in FIG. 12, a QFD chart including only the selected item 450 and the extracted items 514, 518, 524, 528, 532, 546, 550, and 554 is generated and displayed. This type of processing is effective when a QFD chart becomes large (for example, a QFD chart becomes larger than a display, which is a display device, and extracted items are invisible unless the QFD chart is scrolled). The names of the axes shown in FIG. 12 are only examples, and may be set to names indicated in a QED chart, which will be discussed later.

Figure 13:
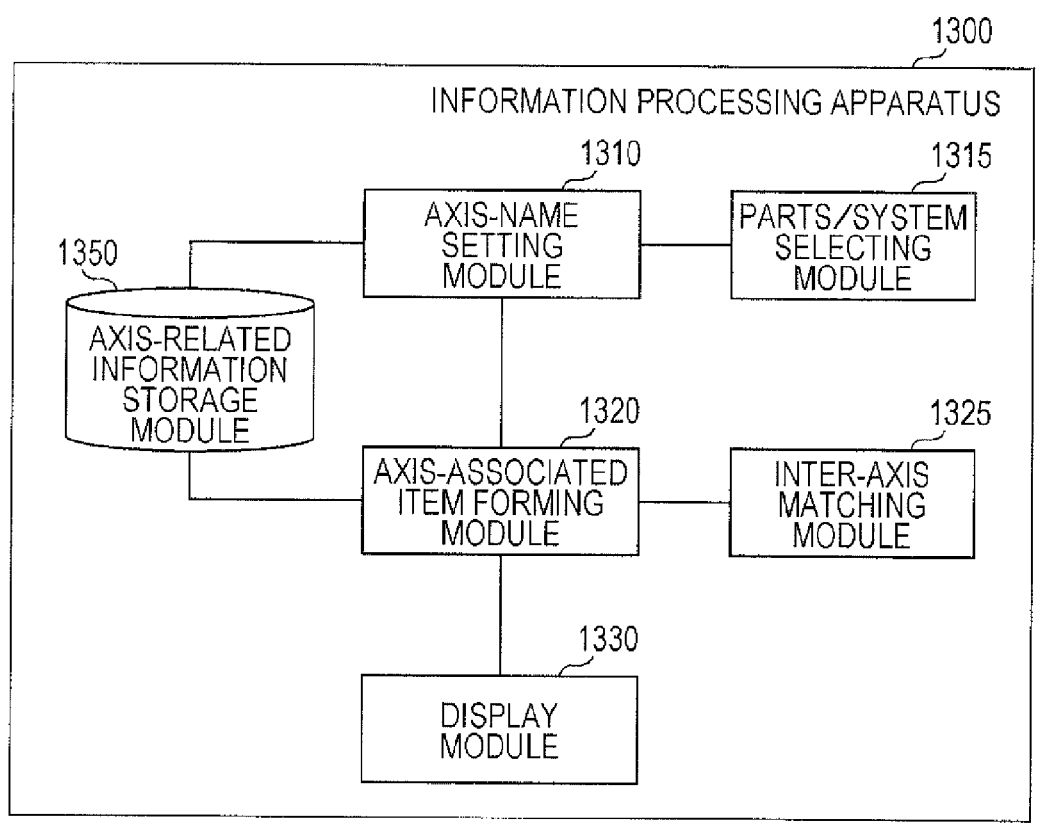
FIG. 13 is a block diagram illustrating conceptual modules of an example of the configuration of a second exemplary embodiment.

FIG. 13 is a block diagram illustrating conceptual modules of an example of the configuration of a second exemplary embodiment. In the second exemplary embodiment, a QFD chart including a selected item and items related to the selected item discussed in the first exemplary embodiment is created and displayed.

An information processing apparatus 1300 of the second exemplary embodiment includes, as shown in FIG. 13, an axis-name setting module 1310, a parts(members)/system selecting module 1315 (hereinafter simply referred to as "parts/system selecting module 1315"), an axis-associated item forming module 1320, an inter-axis matching module 1325, a display module 1330, and an axis-related information storage module 1350.

The information processing apparatus 1300 is utilized for supporting design and development in order to improve the efficiency in developing technologies and products and also to enhance the qualities of technologies and products.

The parts/system selecting module 1315 is connected to the axis-name setting module 1310. The parts/system selecting module 1315 is used for selecting the type of QFD chart to be formed, and more specifically, the parts/system selecting module 1315 selects one of (1) a QFD chart for clarifying relationships between the manufacturing steps for parts and members and the quality of a product obtained by assembling these parts or members (hereinafter may also be referred to as a "parts/members QFD chart") and (2) a QFD chart for clarifying relationships between the design conditions in developing a technology or a product and the quality of the technology or the product (hereinafter may also be referred to as a "system QFD chart"). The names of axes and items associated with the axes, which will be discussed later, will be different depending on which of the parts/members QFD chart and the system QFD chart is selected. In this case, an operator may select the type of QFD chart by performing a selecting operation. Alternatively, the type of QFD chart may be selected according to an operator, or the department or the job type of an operator. For example, a table in which operator identifiers for uniquely identifying operators in this exemplary embodiment are individually associated with the parts/members QFD chart or the system QFD chart may be prepared and stored in the axis-related information storage module 1350, and by using this table, the type of QFD chart may be selected from an operator identifier. Alternatively, a table in which operators are individually associated with departments or job types, and a table in which departments or job types are individually associated with the parts/members QFD chart or the system QFD chart may be prepared and stored in the axis-related information storage module 1350. By using these two tables, the QFD chart may be selected from an operator identifier for uniquely identifying an associated operator.

The axis-name setting module 1310 is connected to the parts/system selecting module 1315, the axis-associated item forming module 1320, and the axis-related information storage module 1350. The axis-name setting module 1310 sets names of first through fourth axes. In this case, the concept of setting of the names of axes includes generating of the names of axes. The axis-name setting module 1310 may set the names of the first through fourth axes on the basis of a selection result of the parts/system selecting module 1315. That is, if the parts/members QFD chart has been selected by the parts/system selecting module 1315, the axis-name setting module 1310 may set "quality" as the name of the first axis, "performance" as the name of the second axis, "structures and physical properties" as the name of the third axis, and "production conditions" as the name of the fourth axis. If the system QFD chart has been selected by the parts/system selecting module 1315, the axis-name setting module 1310 may set "quality" as the name of the first axis, "mechanism" as the name of the second axis, "physical characteristics" as the name of the third axis, and "design conditions" as the name of the fourth axis.

The axis-associated item forming module 1320 is connected to the axis-name setting module 1310, the inter-axis matching module 1325, the display module 1330, and the axis-related information storage module 1350. The axis-associated item forming module 1320 forms, through a selecting operation performed by an operator, items associated with axes for which names are set by the axis-name setting module 1310. The axis-associated item forming module 1320 forms (1) items indicating quality requirements of a product, as items associated with the first axis, (2) items indicating performance capabilities provided by the individual parts and members in order to satisfy the quality requirements of the product, as items associated with the second axis, (3) items concerning the structures and the physical properties of the individual parts and members, as items associated with the third axis, and (4) items which define production conditions for the individual parts and members, as items associated with the fourth axis.

Particularly when the parts/members QFD chart is selected by the parts/system selecting module 1315, the axis-associated item forming module 1320 may form, through a selecting operation performed by an operator, (1) items indicating quality requirements of a product, as items associated with the first axis, (2) items indicating performance capabilities provided by the individual parts and members in order to satisfy the product quality requirements, as items associated with the second axis, (3) items concerning the structures and the physical properties of the individual parts and members, as items associated with the third axis, and (4) items which define design conditions for the individual parts and members, as items associated with the fourth axis.

Alternatively, particularly when the system QFD chart is selected by the parts/system selecting module 1315, the axis-associated item forming module 1320 may form, through a selecting operation performed by an operator, (1) items indicating quality requirements of a product, as items associated with the first axis, (2) items concerning a physical mechanism whose behavior is determined by items of physical characteristics and which dominates the quality of the product, as items associated with the second axis, (3) items indicating system physical characteristics determined by design conditions, as items associated with the third axis, and (4) items indicating design conditions, as items associated with the fourth axis. Additionally, as items associated with each of the first through fourth axes, in addition to the individual parts and members, "all parts/members" (large classification of items) indicating items applicable to all the parts/members may be included.

The axis-associated item forming module 1320 may cause the inter-axis matching module 1325 to determine consistencies of the items formed by the axis-associated item forming module 1320 between different axes.

There may be certain items which are difficult to classify into an exact item in each axis, for example, items applicable to all the parts/members, system parameters, and external disturbance. The axis-associated item forming module 1320 may form such items such that they are deployed in parallel with the items of the associated axes.

Items associated with the axes may be formed in a hierarchical structure having at least one level, such as an axis item table 1500 shown in FIG. 15. FIG. 15 shows an example of the data structure of the axis item table 1500. The axis item table 1500 includes an axis name column 1510 and an item name column 1520. In the axis name column 1510 stores therein names of axes. The item name column 1520 stores therein item names associated with the axes. The items are formed in a hierarchical structure having, for example, three levels, such as large, medium, and small classifications. The item name column 1520 includes a large classification column 1522, a medium classification column 1524, and a small classification column 1526. The large classification column 1522 stores therein, as the first level, items classified under the large classification. The medium classification column 1524 stores therein, as the second level, items classified under the medium classification. The small classification column 1526 stores therein, as the third level, items classified under the small classification. The hierarchical structure may have only one level having a small classification, two levels having large and small classifications, and three levels having large, medium, and small classifications.

The inter-axis matching module 1325 is connected to the axis-associated item forming module 1320. The inter-axis matching module 1325 determines whether there is a consistency of items of a predetermined hierarchical level at least between the first and second axes, the second and third axes, and the third and fourth axes. If the inter-axis matching module 1325 determines that there is no consistency of items, it may correct a corresponding item. In this case, corrections may be made automatically or in accordance with an operation of an operator (for example, correction patterns are shown and an operator is instructed to select one of the correction patterns, or a warning is issued and an operator is instructed to correct an item).

The display module 1330 is connected to the axis-associated item forming module 1320. On the basis of the names of the axes set by the axis-name setting module 1310 and the items formed by the axis-associated item forming module 1320, the display module 1330 displays a QFD chart used for developing a product, in which the names of the first through fourth axes are deployed within a region divided into top, bottom, right and left sections from the center of the QFD chart, the items associated with the first through fourth axes are deployed in the directions extending upward, downward, rightward, and leftward from the center, and matrices into which cause-and-effect relationships between associated items may be input are deployed at least between the first and second axes, the second and third axes, and the third and fourth axes. The QFD chart displayed by the display module 1330 may be a parts/members QFD chart, such as that shown in FIG. 19, or a system QFD chart, such as that shown in FIG. 20, which will be discussed later.

The axis-related information storage module 1350 is connected to the axis-name setting module 1310 and the axis-associated item forming module 1320. The axis-related information storage module 1350 stores therein information related to axes, for example, the axis item table 1500 shown in FIG. 15.

Figure 14:
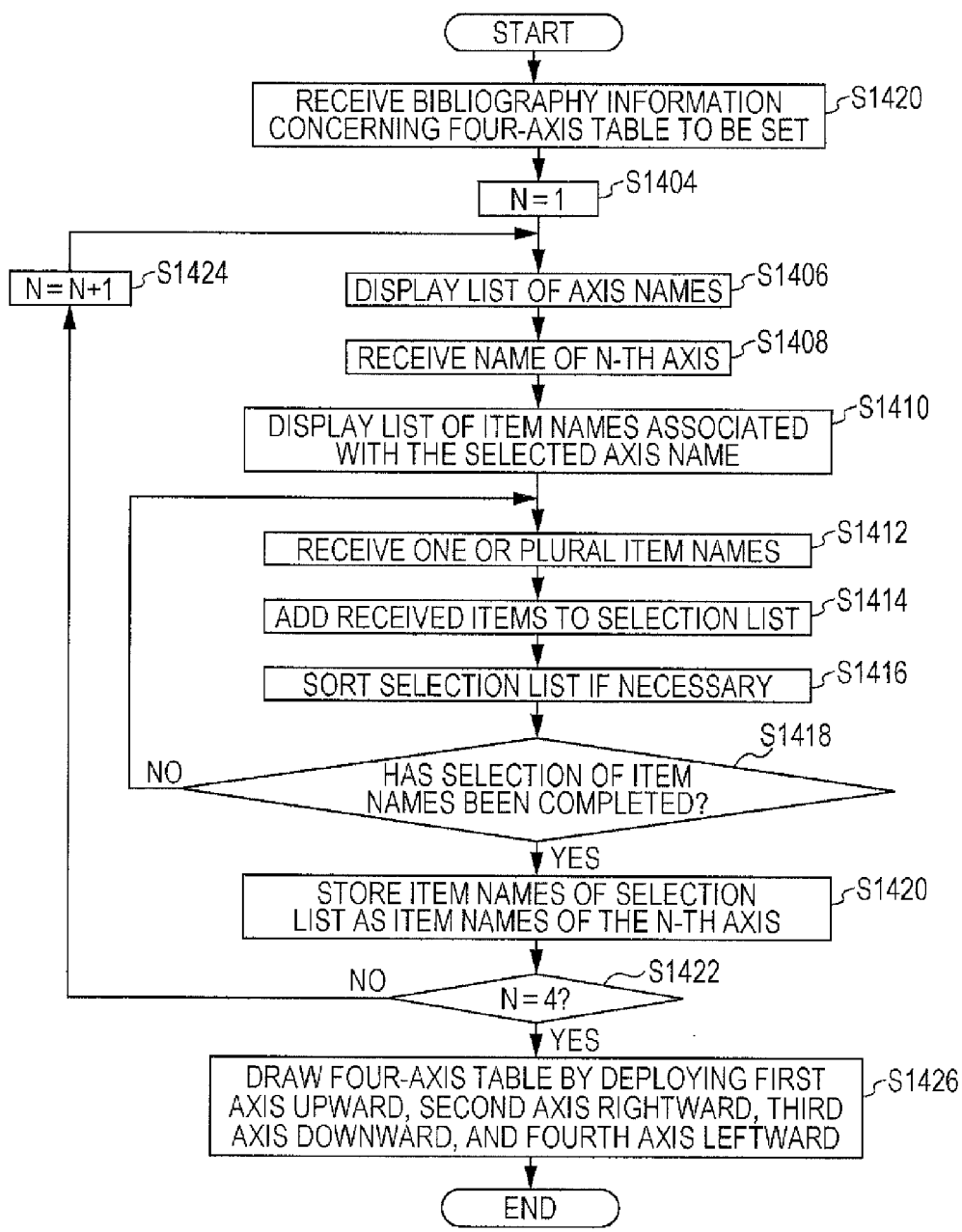
FIG. 14 is a flowchart illustrating an example of processing according to the second exemplary embodiment.

FIG. 14 is a flowchart illustrating an example of processing according to the second exemplary embodiment.

In step S1402, the axis-name setting module 1310 receives bibliography information concerning a four-axis table to be set. Examples of the bibliography information are an operator name, an operator identifier, the date and time at which a table is created, and a product name.

In step S1404, the axis-name setting module 1310 sets a variable N to be 1 (N=1). The variable N is a value indicating an axis number.

Figure 16:
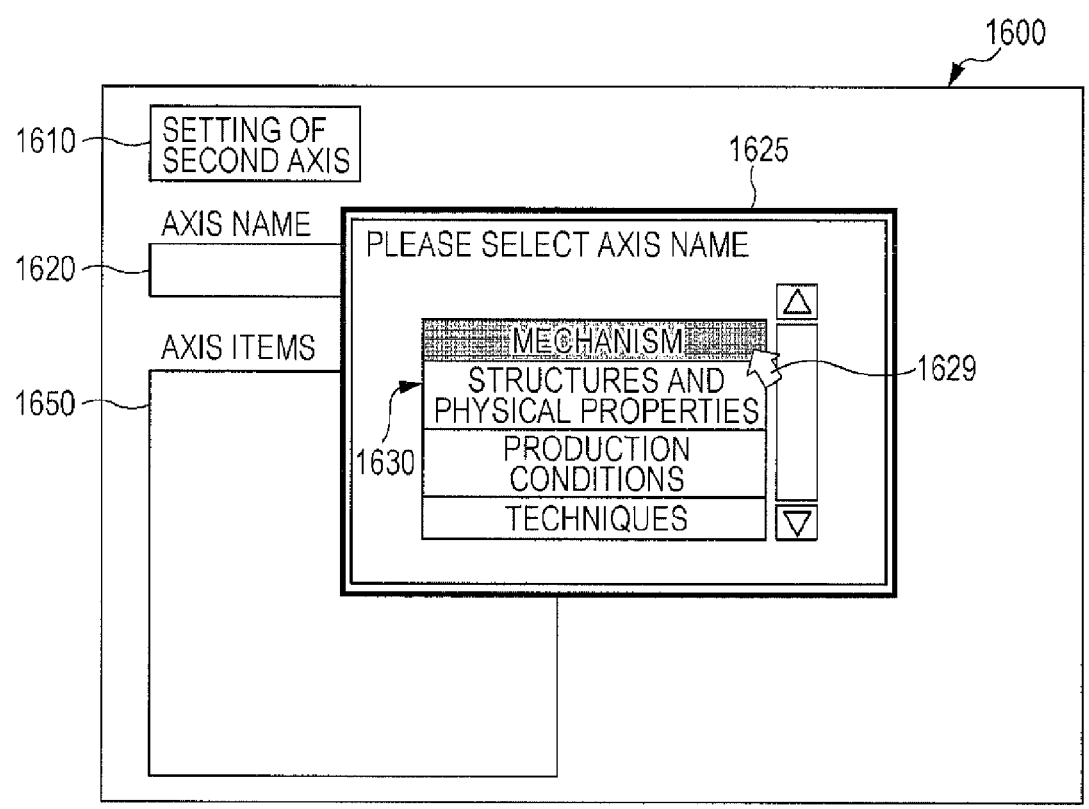
FIG. 16 illustrates an example of processing for displaying and selecting axis names.

In step S1406, the axis-name setting module 1310 displays a list of axis names. FIG. 16 shows an example of processing for displaying and selecting axis names. On a setting screen 1600, such as a liquid crystal display, provided in the information processing apparatus 1300, an N-th axis setting column 1610, an axis-name setting column 1620, and an axis-item setting column 1650 are displayed. The N-th axis setting column 1610 displays a currently selected axis, i.e., an N-th axis, in accordance with the value of the variable N set in step S1404 or S1424. When an operator selects the axis-name setting column 1620 by performing a selecting operation, an axis-name selecting area 1625 including an axis-name list display area 1630 is displayed. Then, the operator is instructed to select one of the axis names displayed in the axis-name list display area 1630 by using a cursor 1629. The axis names within the axis-name list display area 1630 may be extracted from the axis name column 1510 of the axis item table 1500.

In step S1408, the axis-name setting module 1310 receives a name of the N-th axis.

Figure 17:
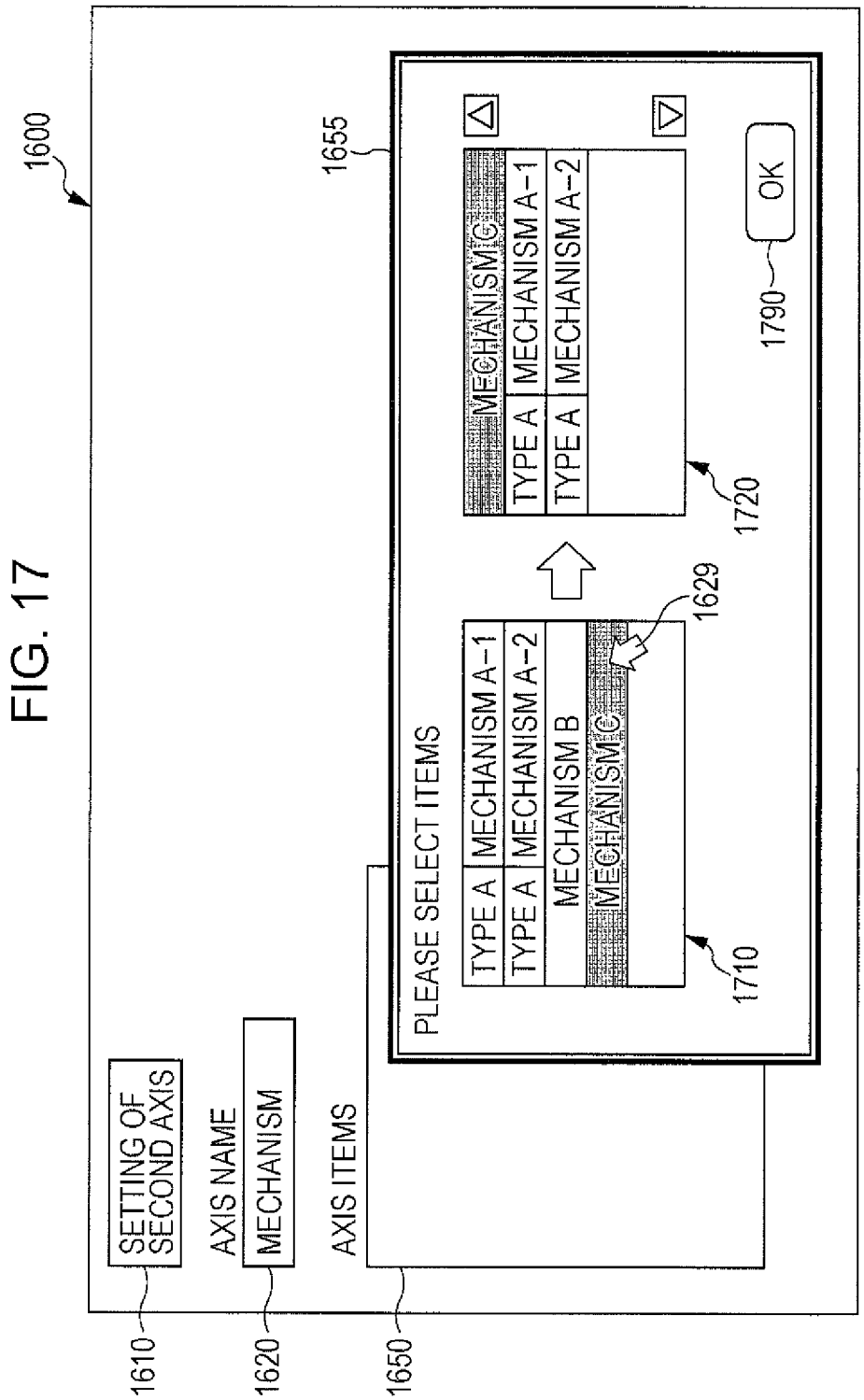
FIG. 17 illustrates an example of processing for displaying and selecting axis items.

In step S1410, the axis-associated item forming module 1320 displays a list of item names associated with the selected axis name. FIG. 17 shows an example of processing for displaying and selecting axis items. On the setting screen 1600, the N-th axis setting column 1610, the axis-name setting column 1620, and the axis-item setting column 1650 are displayed. When the operator selects the axis-item setting column 1650 by performing a selecting operation, an item selecting area 1655 including an item selecting table 1710 and a selection-result display table 1720 is displayed. When the operator selects an item within the item selecting table 1710 by using the cursor 1629, the selected item is moved to the selection-result display table 1720 and is displayed. The item names within the item selecting table 1710 may be extracted from the item name column 1520 of the axis item table 1500.

In step S1412, the axis-associated item forming module 1320 receives one or plural item names.

In step S1414, the axis-associated item forming module 1320 adds the received items to a selection list.

In step S1416, if necessary, the axis-associated item forming module 1320 sorts the selection list. For example, items in the selection list may be sorted in accordance with the order of items of an axis for which items have already been selected.

In step S1418, the axis-associated item forming module 1320 determines whether the selection of item names has been completed. If the result of step S1418 is YES, the process proceeds to step S1420. If the result of step S1418 is NO, the process returns to step S1412. For example, if an OK button 1790 displayed within the item selecting area 1655 shown in FIG. 17 is operated by the operator, the axis-associated item forming module 1320 determines that the selection of item names has been completed.

Figure 18:
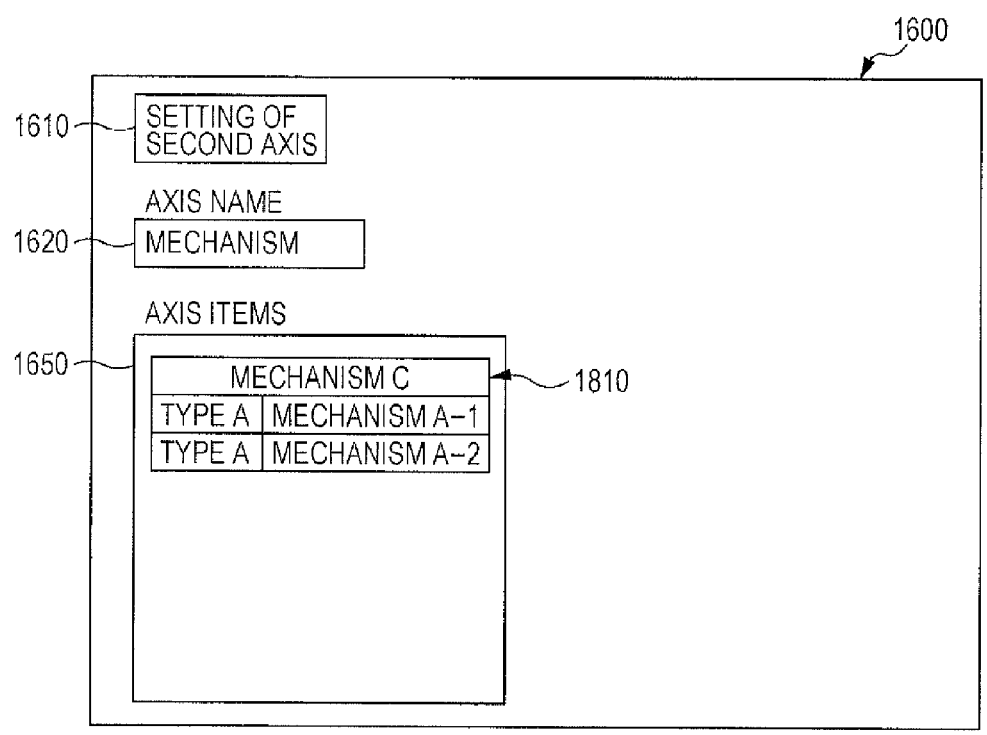
FIG. 18 illustrates a display example of a selected axis name and selected items.

In step S1420, the axis-associated item forming module 1320 stores the item names of the selection list in the axis-related information storage module 1350 as the item names of the N-th axis. FIG. 18 shows a display example of the selected axis name and the selected items. A currently selected axis is displayed in the N-th axis setting column 1610, the name of the axis is displayed in the axis-name setting column 1620, and an axis/item setting result table 1810 is displayed in the axis-item setting column 1650. A combination of the N-th axis setting column 1610, the axis-name setting column 1620, and the axis/item setting result table 1810 is stored in the axis-related information storage module 1350.

In step S1422, the axis-associated item forming module 1320 determines whether N is four. If the result of step S1422 is YES, the process proceeds to step S1426. If the result of step S1422 is NO, the process proceeds to step S1424.

In step S1424, the axis-name setting module 1310 increments N by one (N=N+1).

In this example of processing, the first through fourth axes are sequentially received. However, the operator may select, as desired, axis numbers to which axis names and items associated with the axes are to be appended.

In step S1426, the display module 1330 draws a four-axis table by deploying the first axis upward, the second axis rightward, the third axis downward, and the fourth axis leftward.

Figure 19:
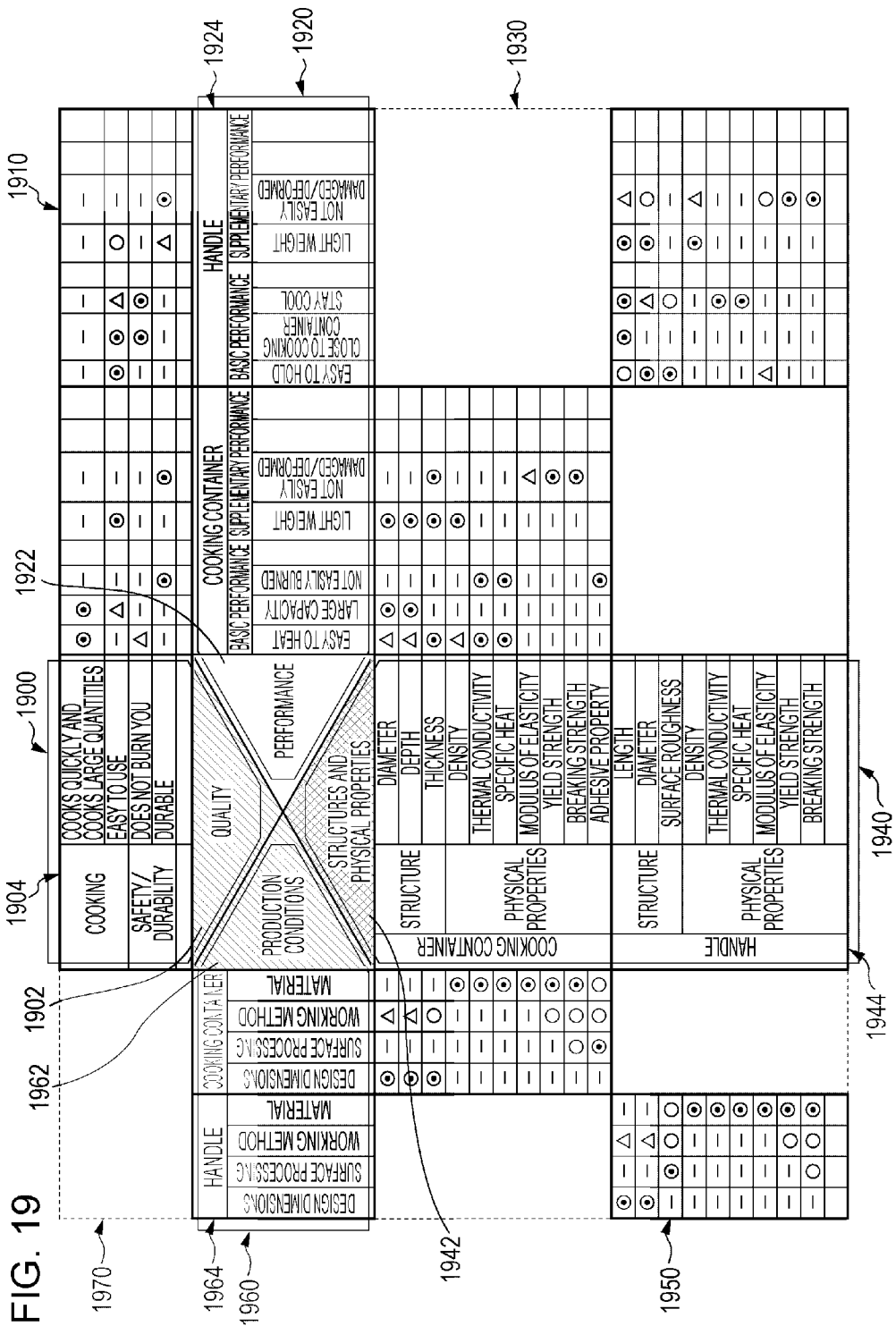
FIG. 19 illustrates a display example of a parts/members QFD chart.
Figure 20:
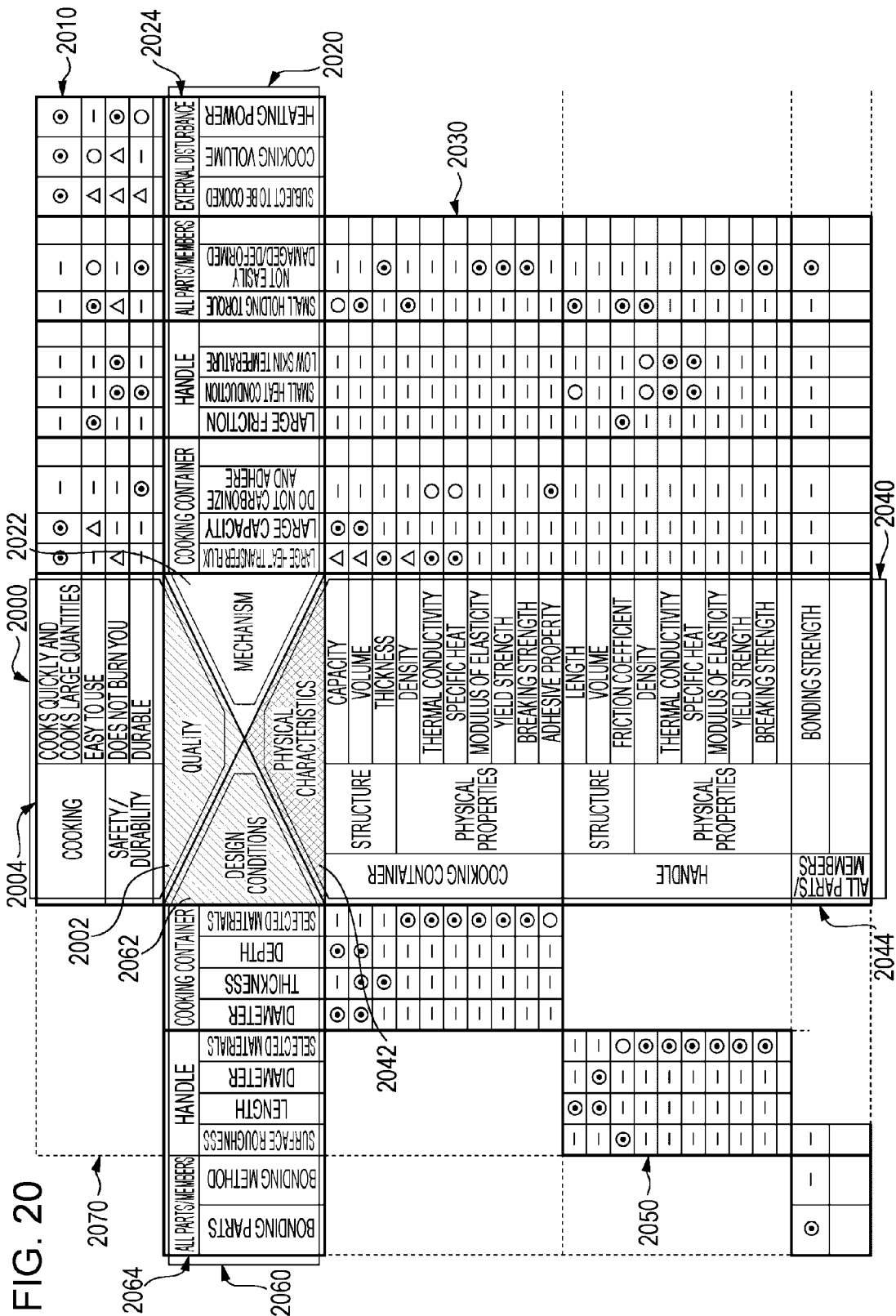
FIG. 20 illustrates a display example of a system QFD chart.

For example, the four-axis table may be displayed as the parts/members QFD chart shown in FIG. 19 or the system QFD chart shown in FIG. 20.

In the example shown in FIG. 19, four axes (a quality axis (first axis) 1900, a performance axis (second axis) 1920, a structures/physical-properties axis (third axis) 1940, and a production-conditions axis (fourth axis) 1960) are shown. The names of the individual axes are displayed in end triangular portions of the four axes 1900, 1920, 1940, and 1960, which are an axis-name display area (quality) 1902, an axis-name display area (performance) 1922, an axis-name display area (structures and physical properties) 1942, and an axis-name display area (production conditions) 1962. Items associated with the quality axis (first axis) 1900 are displayed in an item-name display area 1904 extending upward from the axis-name display area 1902. Items associated with the performance axis (second axis) 1920 are displayed in an item-name display area 1924 extending rightward from the axis-name display area 1922. Items associated with the structures/physical-properties axis (third axis) 1940 are displayed in an item-name display area 1944 extending downward from the axis-name display area 1942. Items associated with the production-conditions axis (fourth axis) 1960 are displayed in an item-name display area 1964 extending leftward from the axis-name display area 1962.

Then, at least in three areas, that is, in an item-correlation area 1910 between the item-name display areas 1904 and 1924, in an item-correlation area 1930 between the item-name display areas 1924 and 1944, and in an item-correlation area 1950 between the item-name display areas 1944 and 1964, matrices are generated. In these matrices, for example, in a matrix generated in the item-correlation area 1910, at a position at which two associated items displayed in the item-name display areas 1904 and 1924 intersect with each other, a cause-and-effect relationship between these two items may be input. For example, at a position between an item "does not burn you" of "safety/durability" in the item-name display area 1904 and an item "stay cool" of "basic performance" of "handle" in the item-name display area 1924, a symbol ⊙ indicating a strong correlation is input. The correlation between two associated items may be represented by a numeric value, a color, or a combination thereof. For example, if a positive correlation is indicated by a red symbol and a negative correlation is indicated by a blue symbol, signs (+ and −) of a correlation may also be indicated, in addition to the strength of a correlation. In an item-correlation area 1970 between the item-name display areas 1904 and 1964, a matrix into which cause-and-effect relationships between items in the item-correlation areas 1904 and 1964 may be input may be generated. In this parts/members QFD chart, influences of "production conditions" on "quality" can be examined from the relationships between "production conditions" and "structures and physical properties", the relationships between "structures and physical properties" and "performance", and between "performance" and "quality". That is, the information processing apparatus 1300 of the second exemplary embodiment makes it easier to clarify a mechanism for obtaining a certain result, i.e., "quality" (phenomenon), from "production conditions" through "structures and physical properties" and "performance", than the use of information processing apparatuses other than the second exemplary embodiment. For example, it is possible to understand in advance the fact that certain measures to improve the quality of one factor may decrease the quality of another factor and the reason for this fact. Then, if a development technical problem occurs, it is possible to extract an analytic technique for examining reasons or measures for this problem, and also to obtain such an analytic technique in advance.

For example, in order to fill in the matrix concerning the second axis, it is necessary to understand the mechanism of functions of individual parts and members. By checking for portions of the matrix into which an operator is unable to input a symbol, a numeric value, etc., indicating a relationship between items, necessary analytic techniques can be extracted.

Generally, the factors indicated in the individual axes are handled by different departments, and thus, collaboration between different departments can be promoted.

As shown in FIGS. 16 and 17, when axis names and item names are selected from prepared lists, the same terms are used in any multi-axis tables. Thus, the second exemplary embodiment is particularly effective.

The example shown in FIG. 20 is similar to that shown in FIG. 19. However, since the example shown in FIG. 20 concerns a system QFD chart, it has an item "all parts/members" in addition to items concerning individual parts and members, as stated above. By using this system QFD chart, influences of "design conditions" on "quality" can be examined from the relationships between "design conditions" and "physical characteristics", the relationships between "physical characteristics" and "mechanism", and the relationships between "mechanism" and "quality". That is, the information processing apparatus 100 of this exemplary embodiment makes it easier to clarify a mechanism for obtaining a certain result, i.e., "quality" (phenomenon), from "design conditions" through "physical characteristics" and "mechanism", than the use of information processing apparatuses other than the second exemplary embodiment. For example, it is possible to understand in advance the fact that certain measures to improve the quality of one factor may decrease the quality of another factor and the reason for this fact. Then, if a development technical problem occurs, it is possible to extract an analytic technique for examining reasons or measures for this problem, and also to obtain such an analytic technique in advance.

For example, in order to fill in the matrix concerning the second axis, it is necessary to understand a physical mechanism in which characteristics determined by design conditions influence the quality. By checking for portions of the matrix into which an operator is unable to input a symbol, a numeric value, etc., indicating a relationship between items, necessary analytic techniques can be extracted.

After an operator has input symbols, numeric values, etc. indicating correlations between items, if there are some portions of matrices into which symbols, numeric values, etc. are not input, the display module 1330 may display information that there are some items for which correlations are not indicated. For example, such portions of the matrices may be displayed in a color different from the color of the other portions of the matrices in which correlations are indicated.

Additionally, items of a matrix concerning the third axis into which correlations are not indicated may be extracted, and the display module 1330 may indicate that such items are included as items of "structures/physical-properties" in association with "performance" but correlations are not indicated because of an insufficient measurement technique.

Figure 21:
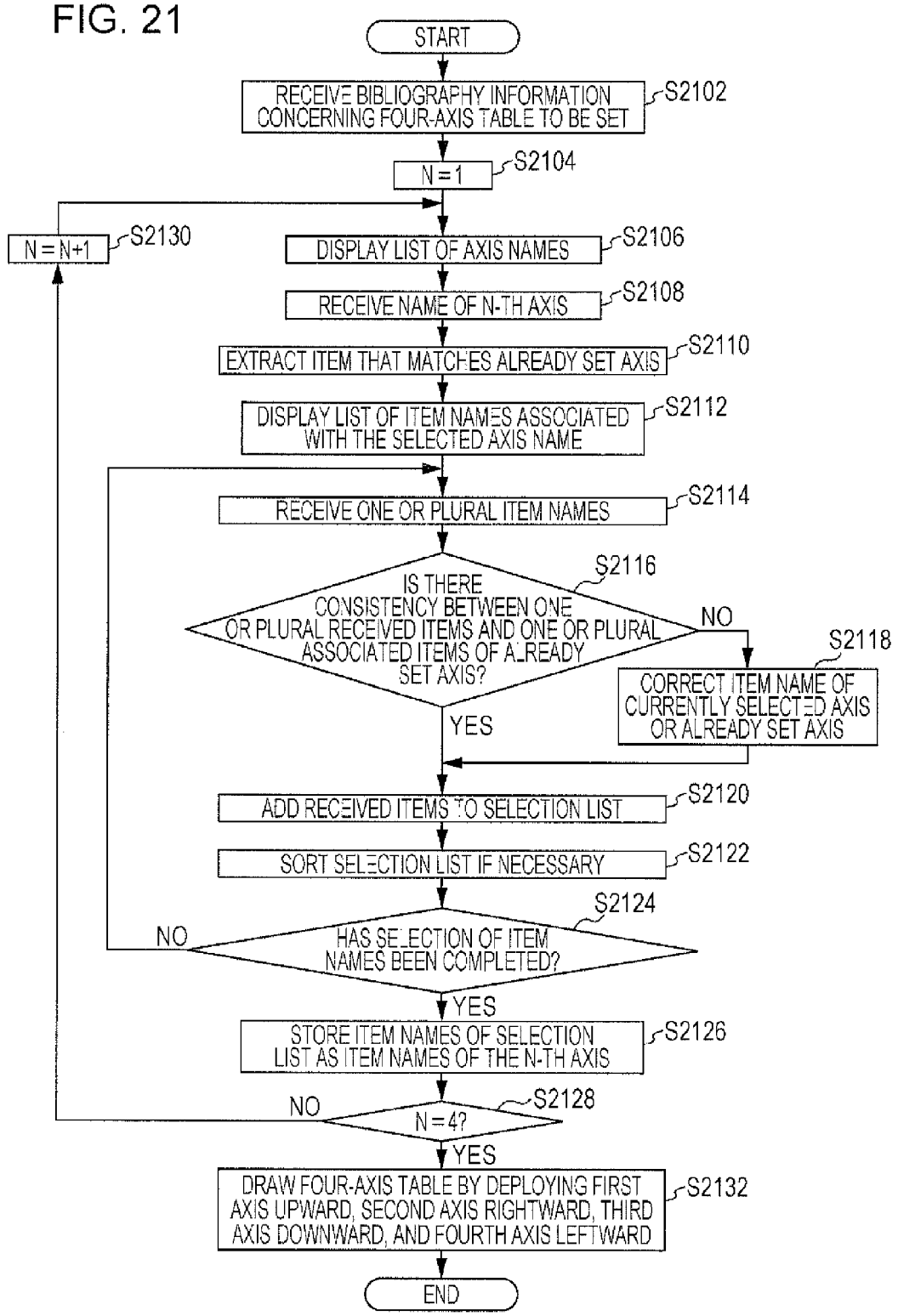
FIG. 21 is a flowchart illustrating another example of processing according to the second exemplary embodiment.

FIG. 21 is a flowchart illustrating another example of processing according to the second exemplary embodiment. In this flowchart, steps S2110, S2116, and S2118 are added to the steps of the flowchart in FIG. 14. Details of steps S2110, S2116, and S2118 will be given. The other steps are similar to those in FIG. 14.

In step S2102, the axis-name setting module 1310 receives bibliography information concerning a four-axis table to be set.

In step S2104, the axis-name setting module 1310 sets a variable N to be 1 (N=1).

In step S2106, the axis-name setting module 1310 displays a list of axis names.

In step S2108, the axis-name setting module 1310 receives a name of the N-th axis.

In step S2110, an item that matches a certain item of an axis for which items have already been set is extracted. The axis-associated item forming module 1320 causes the inter-axis matching module 1325 to perform this processing. For example, an item that matches the item classified under the large classification of the hierarchical structure of an already set axis is extracted. As the axis for which items have already been set (hereinafter simply referred to as an "already set axis"), an axis which forms a matrix together with a currently selected axis may be used. For example, if the currently selected axis is the second axis, the already set axis is the first axis. If the currently selected axis is the third axis, the already set axis is the second axis. If the currently selected axis is the fourth axis, the already set axis is the third axis.

In step S2112, the axis-associated item forming module 1320 displays a list of item names associated with the selected axis name. In this case, only the items extracted in step S2110 may be displayed. Alternatively, items other than the items extracted in step S2110 may also be included, in which case, the items extracted in step S2110 may be displayed in a mode (shape, pattern, color, or a combination thereof) different from that of the other items.

In step S2114, the axis-associated item forming module 1320 receives one or plural item names.

In step S2116, the inter-axis matching module 1325 determines whether there is a consistency between one or plural items selected in step S2114 and one or plural associated items of the already set axis. If the result of step S2116 is YES, the process proceeds to step S2120. If the result of step S2116 is NO, the process proceeds to step S2118. In this case, "having a consistency" means that items have a hierarchical structure and the name of the item associated with the currently selected axis classified under a predetermined level of the hierarchical structure is the same as that associated with the already set axis. The already set axis may be an axis which forms a matrix with a currently selected axis, as stated above. If there is an item that does not match a certain item of the already set axis, the process proceeds to step S2118.

In step S2118, the axis-associated item forming module 1320 corrects the name of the item of the currently selected axis or the already set axis. In this case, the operator is allowed to correct the name of the item of the currently selected axis or the already set axis. However, the operator does not necessarily have to make correction.

In step S2120, the axis-associated item forming module 1320 adds the received items to a selection list.

In step S2122, if necessary, the axis-associated item forming module 1320 sorts the selection list.

In step S2124, the axis-associated item forming module 1320 determines whether the selection of item names has been completed. If the result of step S2124 is YES, the process proceeds to step S2126. If the result of step S2124 is NO, the process returns to step S2114.

In step S2126, the axis-associated item forming module 1320 stores the item names of the selection list in the axis-related information storage module 1350 as the item names of the N-th axis.

In step S2128, the axis-associated item forming module 1320 determines whether N is four. If the result of step S2128 is YES, the process proceeds to step S2132. If the result of step S2128 is NO, the process proceeds to step S2130.

In step S2130, the axis-name setting module 1310 increments N by one (N=N+1).

In step S2132, the display module 1330 draws a four-axis table by deploying the first axis upward, the second axis rightward, the third axis downward, and the fourth axis leftward.

Figure 22:
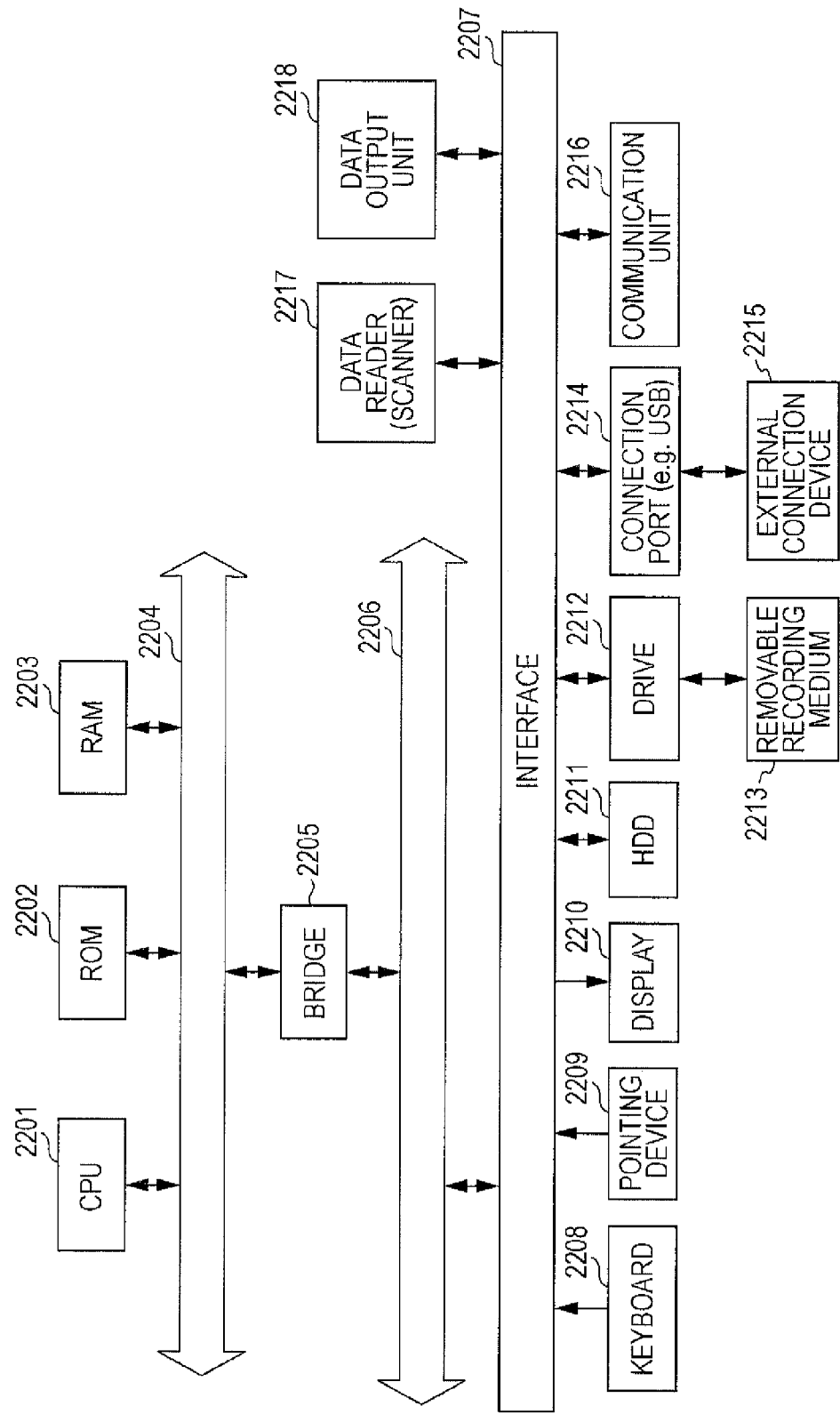
FIG. 22 illustrates an example of the hardware configuration of a computer implementing an exemplary embodiment.

An example of the hardware configuration of the information processing apparatuses 100 and 1300 of the first and second exemplary embodiments will be described below with reference to FIG. 22. The configuration shown in FIG. 22 is an example of the hardware configuration of, for example, a personal computer (PC), including a data reader 2217, such as a scanner, and a data output unit 2218, such as a printer.

A central processing unit (CPU) 2201 is a controller that executes processing in accordance with a computer program which describes an execution sequence of modules discussed in the above-described first and second exemplary embodiments, such as the item selecting module 110, the adjacent-axis item score calculating module 120, the two-adjacent-axis item score calculating module 130, the display module 140, the axis-name setting module 1310, the parts/system selecting module 1315, the axis-associated item forming module 1320, the inter-axis matching module 1325, and the display module 1330.

A read only memory (ROM) 2202 stores therein programs and operation parameters used by the CPU 2201. A random access memory (RAM) 2203 stores therein a program used during the execution of the CPU 2201 and parameters which vary appropriately during the execution of the CPU 2201. The CPU 2201, the ROM 2202, and the RAM 2203 are connected to one another via a host bus 2204, such as a CPU bus.

The host bus 2204 is connected to an external bus 2206, such as a Peripheral Component Interconnect/Interface (PCI) bus, via a bridge 2205.

A keyboard 2208 and a pointing device 2209, such as a mouse, are input devices operated by an operator. A display 2210, such as a liquid crystal display device or a cathode ray tube (CRT), displays various items of information as text or image information.

A hard disk drive (HDD) 2211 contains a hard disk and drives the hard disk to record or play back information or a program executed by the CPU 2201. In the hard disk, the axis item table 1500, set axis names, set item names, etc. are stored. Various other computer programs, such as various data processing programs, are also stored in the hard disk.

A drive 2212 reads data or a program recorded on a removable recording medium 2213 set in the drive 2212, such as a magnetic disk, an optical disc, a magneto-optical disk, or a semiconductor memory, and supplies the read data or program to the RAM 2203 connected to the drive 2212 via an interface 2207, the external bus 2206, the bridge 2205, and the host bus 2204. The removable recording medium 2213 is also usable as a data recording region, which is similar to a hard disk.

A connection port 2214 is a port used for connecting an external connection device 2215 to the PC, and has a connecting portion, such as a Universal Serial Bus (USB) port or an IEEE1394 port. The connection port 2214 is connected to, for example, the CPU 2201, via the interface 2207, the external bus 2206, the bridge 2205, and the host bus 2204. A communication unit 2216 is connected to a communication line and executes data communication processing with external sources. The data reader 2217 is, for example, a scanner, and executes processing for reading documents. The data output unit 2218 is, for example, a printer, and executes processing for outputting document data.

The hardware configuration of the information processing apparatus 100 or 1300 shown in FIG. 22 is only an example, and the exemplary embodiments may be configured in any manner as long as the modules described in the exemplary embodiments are executable. For example, some modules may be configured as dedicated hardware (e.g., an application specific integrated circuit (ASIC)), or some modules may be installed in an external system and be connected to the PC via a communication line. Alternatively, a system, such as that shown in FIG. 22, may be connected to a system, such as that shown in FIG. 22, via a communication line, and may be operated in cooperation with each other.

In the above-described first and second exemplary embodiments, when comparing a certain value with a predetermined value, "equal to or greater than", "equal to or smaller than", "greater than", and "smaller than" may also be read as "greater than", "smaller than", "equal to or greater than", and "equal to or smaller than", respectively, unless there is an inconsistency between a combination of two values to be compared.

The above-described program may be stored in a recording medium and be provided. The program recorded on a recording medium may be provided via a communication medium. In this case, the above-described program may be implemented as a "non-transitory computer readable medium storing the program therein" in an exemplary embodiment of the invention.

The "non-transitory computer readable medium storing a program therein" is a recording medium storing a program therein that can be read by a computer, and is used for installing, executing, and distributing the program.

Examples of the recording medium are digital versatile disks (DVDs), and more specifically, DVDS standardized by the DVD Forum, such as DVD-R, DVD-RW, and DVD-RAM, DVDs standardized by the DVD+RW Alliance, such as DVD+R and DVD+RW, compact discs (CDs), and more specifically, a read only memory (CD-ROM), a CD recordable (CD-R), and a CD rewritable (CD-RW), Blu-ray disc (registered), a magneto-optical disk (MO), a flexible disk (FD), magnetic tape, a hard disk, a ROM, an electrically erasable programmable read only memory (EEPROM) (registered), flash memory, a RAM, a secure digital (SD) memory card, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be part of another program, or may be recorded, together with another program, on a recording medium. The program may be divided and recorded on plural recording media. Further, the program may be recorded in any form, e.g., it may be compressed or encrypted, as long as it can be reconstructed.

The second exemplary embodiment discussed with reference to FIGS. 13 through 21 may be implemented as follows. The first exemplary embodiment may be combined with the second exemplary embodiment.

(A1) An information processing apparatus comprising:

an axis-name setting unit that sets names of first through fourth axes;

an item forming unit that forms an item associated with an axis for which a name is set by the axis-name setting unit; and a display that displays, on the basis of the names of the first through fourth axes set by the axis-name setting unit and the items formed by the item forming unit, a quality function deployment chart used for developing a product, in which the names of the first through fourth axes are deployed in a region divided into top, bottom, right, and left sections from a center of the quality function deployment chart, the items associated with the first through fourth axes are deployed in directions extending upward, downward, rightward, and leftward from the center, and matrices into which relationships between items are input are deployed at least between the first axis and the second axis, between the second axis and the third axis, and between the third axis and the fourth axis, wherein the item forming unit forms items associated with the first through fourth axes as a result of an operator selecting an item indicating a quality requirement of the product as an item associated with the first axis, an item indicating a performance capability necessary for satisfying a quality requirement of the product by each of parts and members of the product as an item associated with the second axis, an item concerning a structure and a physical property of each of the parts and the members of the product as an item associated with the third axis, and an item which defines a production condition for each of the parts and the members of the product as an item associated with the fourth axis.

(A2) An information processing apparatus comprising:
an axis-name setting unit that sets names of first through fourth axes;
an item forming unit that forms an item associated with an axis for which a name is set by the axis-name setting unit; and
a display that displays, on the basis of the names of the first through fourth axes set by the axis-name setting unit and the items formed by the item forming unit, a quality function deployment chart used for developing a product, in which the names of the first through fourth axes are deployed in a region divided into top, bottom, right, and left sections from a center of the quality function deployment chart, the items associated with the first through fourth axes are deployed in directions extending upward, downward, rightward, and leftward from the center, and matrices into which relationships between items are input are deployed at least between the first axis and the second axis, between the second axis and the third axis, and between the third axis and the fourth axis,
wherein the item forming unit forms items associated with the first through fourth axes as a result of an operator selecting an item indicating a quality requirement of the product as an item associated with the first axis, an item concerning a physical mechanism which dominates a quality of the product, the behavior of the physical mechanism being determined by an item of a physical characteristic, as an item associated with the second axis, an item indicating a system physical characteristic determined by a design condition as an item associated with the third axis, and an item indicating a design condition as an item associated with the fourth axis.

(A3) The information processing apparatus according to (A1) or (A2), wherein the axis-name setting unit displays an axis name list for the operator, and sets names selected from the axis name list by the operator as the names of the axes.

(A4) The information processing apparatus according to one of (A1) to (A3), wherein the item forming unit displays an item list for the operator, and sets items selected from the item list by the operator as the items associated with the axes.

(A5) The information processing apparatus according to one of (A1) to (A4), wherein:
the items associated with the axes have a hierarchical structure; and
the item forming unit determines whether there is a consistency of items in a predetermined level of the hierarchical structure at least between the first axis and the second axis, between the second axis and the third axis, and between the third axis and the fourth axis, and if it is determined that there is no consistency of items in the predetermined level of the hierarchical structure, the item forming unit corrects an item of one axis which is not consistent with an associated item of an associated axis to be compared.

(A6) A non-transitory computer readable medium storing a program causing a computer to execute a process, the process comprising:
setting names of first through fourth axes;
forming an item associated with an axis for which a name is set; and
displaying, on the basis of the set names of the first through fourth axes and the formed items, a quality function deployment chart used for developing a product, in which the names of the first through fourth axes are deployed in a region divided into top, bottom, right, and left sections from a center of the quality function deployment chart, the items associated with the first through fourth axes are deployed in directions extending upward, downward, rightward, and leftward from the center, and matrices into which relationships between items are input are deployed at least between the first axis and the second axis, between the second axis and the third axis, and between the third axis and the fourth axis,
wherein items associated with the first through fourth axes are formed as a result of an operator selecting an item indicating a quality requirement of the product as an item associated with the first axis, an item indicating a performance capability necessary for satisfying a quality requirement of the product by each of parts and members of the product as an item associated with the second axis, an item concerning a structure and a physical property of each of the parts and the members of the product as an item associated with the third axis, and an item which defines a production condition for each of the parts and the members of the product as an item associated with the fourth axis.

(A7) A non-transitory computer readable medium storing a program causing a computer to execute a process, the process comprising:
setting names of first through fourth axes;
forming an item associated with an axis for which a name is set; and
displaying, on the basis of the set names of the first through fourth axes and the formed items, a quality function deployment chart used for developing a product, in which the names of the first through fourth axes are deployed in a region divided into top, bottom, right, and left sections from a center of the quality function deployment chart, the items associated with the first through fourth axes are deployed in directions extending upward, downward, rightward, and leftward from the center, and matrices into which relationships between items are input are deployed at least between the first axis and the second axis, between the second axis and the third axis, and between the third axis and the fourth axis,
wherein items associated with the first through fourth axes are formed as a result of an operator selecting an item indicating a quality requirement of the product as an item associated with the first axis, an item concerning a physical mechanism which dominates a quality of the product, the behavior of the physical mechanism being determined by an item of a physical characteristic, as an item associated with the second axis, an item indicating a system physical characteristic determined by a design condition as an item associated with the third axis, and an item indicating a design condition as an item associated with the fourth axis.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a selector that selects, as a first item, an item disposed within a quality function deployment chart through a selecting operation performed by an operator, the quality function deployment chart having at least three axes, an item being associated with each of the axes, and a matrix which indicates relationships between items being deployed between two axes of the quality function deployment chart;
a first calculator that performs calculating processing for calculating a first correlation score between the first item selected by the selector and an item associated with an axis adjacent to the axis of the first item;
a first extracting unit that performs extracting processing for comparing the correlation score calculated by the first calculator with a predetermined value and using the comparison result to extract a second item related to the first item;
a second calculator that performs calculating processing for calculating a second correlation score between (1) the second item extracted by the first extracting unit and (2) an item associated with an axis adjacent to the axis of the second item so as to determine the second calculated correlation score to be a correlation score between the item associated with the adjacent axis and the first item;
a second extracting unit that performs extracting processing for comparing the second correlation score calculated by the second calculator with a predetermined value and using the comparison results of the second extracting unit for extracting a third item related to the first item; and
a display unit that displays the first item, the second item, and the third item within the quality function deployment chart in a mode different from a mode of the other items.

2. The information processing apparatus according to claim 1, further comprising:
a controller that performs control so that the second calculator and the second extracting unit will respectively perform the calculating processing and the extracting processing at least one time, by using the third item extracted by the second extracting unit as the second item,
wherein the display unit displays the first item, the second item, and the item extracted by the second extracting unit in a mode different from a mode of the other items.

3. The information processing apparatus according to claim 2, the controller performs control so that, after finishing repeatedly performing the calculating processing and the extracting processing in a first direction, the second calculator and the second extracting unit will respectively restart the calculating processing and the extracting processing and repeat the calculating processing and the extracting processing at least one time, in a second direction which is opposite to the first direction, on an item associated with an axis which is positioned in the second direction adjacent to an axis subjected to the calculating processing and the extracting processing performed in the first direction.

4. The information processing apparatus according to claim 1, wherein the display unit displays a quality function deployment chart including only the first item, the second item, and the item extracted by the second extracting unit.

5. The information processing apparatus according to claim 2, wherein the display unit displays a quality function deployment chart including only the first item, the second item, and the item extracted by the second extracting unit.

6. The information processing apparatus according to claim 3, wherein the display unit displays a quality function deployment chart including only the first item, the second item, and the item extracted by the second extracting unit.

7. An information processing method comprising:
selecting, as a first item, an item disposed within a quality function deployment chart through a selecting operation performed by an operator, the quality function deployment chart having at least three axes, an item being associated with each of the axes, and a matrix which indicates relationships between items being deployed between two axes of the quality function deployment chart;
performing calculating processing for calculating a first correlation score between the first item and an item associated with an axis adjacent to the axis of the first item;
performing extracting processing for comparing the calculated correlation score with a predetermined value and using the comparison result to extract a second item related to the first item;
performing calculating processing for calculating a second correlation score between (1) the second item and (2) an item associated with an axis adjacent to the axis of the second item so as to determine the second calculated correlation score to be a correlation score between the item associated with the adjacent axis and the first item;
performing extracting processing for comparing the second correlation score with a predetermined value and using the comparison results of the second extracting unit for extracting a third item related to the first item; and
displaying the first item, the second item, and the third item within the quality function deployment chart in a mode different from a mode of the other items.

8. A non-transitory computer readable medium storing a program causing a computer to execute a process, the process comprising:
selecting, as a first item, an item disposed within a quality function deployment chart through a selecting operation performed by an operator, the quality function deployment chart having at least three axes, an item being associated with each of the axes, and a matrix which indicates relationships between items being deployed between two axes of the quality function deployment chart;
performing calculating processing for calculating a first correlation score between the first item and an item associated with an axis adjacent to the axis of the first item;
performing extracting processing for comparing the calculated correlation score with a predetermined value and using the comparison result to extract a second item related to the first item;
performing calculating processing for calculating a second correlation score between (1) the second item and (2) an item associated with an axis adjacent to the axis of the second item so as to determine the second calculated correlation score to be a correlation score between the item associated with the adjacent axis and the first item;

performing extracting processing for comparing the second correlation score with a predetermined value and using the comparison results of the second extracting unit for extracting a third item related to the first item; and displaying the first item, the second item, and the third item within the quality function deployment chart in a mode different from a mode of the other items.

* * * * *